United States Patent [19]

Nakamura et al.

[11] Patent Number: 4,751,856

[45] Date of Patent: Jun. 21, 1988

[54] DEVICE FOR CONTROLLING 4WD VEHICLE CENTRAL DIFFERENTIAL RESTRICTION DEVICE ACCORDING TO VEHICLE ROAD SPEED AND ENGINE LOAD, AND METHOD OF OPERATION THEREOF

[75] Inventors: Yasunari Nakamura; Mitsuru Takada, both of Toyota, Japan

[73] Assignee: Toyota Jidosha Kabushiki Kaisha, Aichi, Japan

[21] Appl. No.: 50,490

[22] Filed: May 18, 1987

[30] Foreign Application Priority Data

May 22, 1986 [JP] Japan .................................. 61-118234
Jun. 5, 1986 [JP] Japan .................................. 61-130958
Aug. 27, 1986 [JP] Japan .................................. 61-200289

[51] Int. Cl.$^4$ ......................... B60K 41/18; F16H 1/44
[52] U.S. Cl. .................................. 74/866; 74/710.5; 180/249
[58] Field of Search ............... 74/710.5, 866; 180/233, 180/248, 249, 251

[56] References Cited

U.S. PATENT DOCUMENTS

| 3,845,671 | 11/1974 | Sharp et al. ...................... 74/710.5 |
| 4,538,700 | 9/1985 | Suzuki ............................ 74/710.5 X |
| 4,690,239 | 1/1987 | Takahashi et al. ................. 180/249 |
| 4,693,143 | 9/1987 | Harada et al. .................... 74/866 |
| 4,699,236 | 10/1987 | Morisawa et al. .................. 180/249 |
| 4,702,341 | 10/1987 | Taga et al. ...................... 180/249 |

FOREIGN PATENT DOCUMENTS 2168116 6/1986 United Kingdom ................ 180/233

Primary Examiner—Dirk Wright
Attorney, Agent, or Firm—Parkhurst & Oliff

[57] ABSTRACT

In a four wheel drive vehicle, a central differential device receives rotational power from an engine and provides it to the combination of the front wheels of the vehicle and also to the combination of the rear wheels of the vehicle. This central differential device includes a device for selectively restricting its operation. A control device is provided for this central differential device operation restriction device, and includes: (a) a means for detecting a condition representative of the road speed of the vehicle and of the load on the engine; and (b) a means for controlling the device for selectively restricting the operation of the central differential device, so that the operation of the central differential device is less restricted than otherwise, when the vehicle speed is relatively high and also the engine output is not relatively high. Various specializations of this control device, and also the method of operation thereof, are also disclosed.

22 Claims, 9 Drawing Sheets

DEVICE FOR CONTROLLING 4WD VEHICLE CENTRAL DIFFERENTIAL RESTRICTION DEVICE ACCORDING TO VEHICLE ROAD SPEED AND ENGINE LOAD, AND METHOD OF OPERATION THEREOF

BACKGROUND OF THE INVENTION

The present invention relates to a central differential operation restriction device control device and to a method of operation thereof, for a vehicle adapted for four wheel drive operation and incorporating a four wheel drive power transmission system, and more particularly relates to such a central differential operation restriction device control device and method of operation thereof for a vehicle such as an automobile incorporating such a four wheel drive power transmission system, said central differential operation restriction device control device and method providing control according to the current values of vehicle road speed and of engine load.

The present invention has been described in Japanese Patent Applications Ser. Nos. Showa 61-118234 Showa 61-130958 and Showa 61-200289 (1986), all of them having been filed by an applicant the same as the entity assigned or owed duty of assignment of the present patent application; and the present application hereby incorporates into itself by reference the text of said Japanese Patent Applications and the claims and the drawings thereof; copies are appended to the present application.

Nowadays a greatly increasing number of automotive vehicles are being constructed with four wheel drive transmission systems, because such four wheel drive operation, in which all four wheels of the vehicle are powered from its engine via its tranmsission, is very suitable for driving on poor or slippery road surfaces such as in mud or over bad ground, or upon raods covered with mud, snow, ice, or rain. In other words, four wheel drive operation provides a much higher degree of stability and drivability for the vehicle in conditions where the coefficient of friction between the wheels and the surface upon which the vehicle is riding is relatively low. Also, four wheel drive operation is beneficial for aiding with hill climbing characteristics and high speed stability characteristics. Therefore, the so called full time four wheel drive type of transmission, which remains always engaged to four wheel drive without any episodes of two wheel driving, is becoming more and more popular.

In such a four wheel drive transmission system for an automotive vehicle, it is usual to provide a center differential device for distributing rotational power between the front wheels of the vehicle and the rear wheels of the vehicle, as well as the per se conventional rear differential device that provides differential action between the two rear vehicle wheels and the also per se conventional front differential device that provides differential action between the two front vehicle wheels. Such a central or front - rear differential device is provided in order to provide a differential action between said front vehicle wheels (considered as a pair) and said rear vehicle wheels (also considered as a pair) when the vehicle is turning around a curve, in order to eliminate the possibility of the occurrence of the so called tight corner braking phenomenon created by the difference in the turning radiuses of the front wheels of the vehicle and the rear wheels thereof, when the vehicle is turning around a curve or corner, and also for various other reasons. And such provision of such a central or front - rear differential device is effective for achieving this result. Further, it has been practiced to provide an automatic transmission system to a vehicle which is equipped with such a four wheel drive type transmission. Such a type of structure is disclosed, for example, in Japanese Patent Application Laying Open Publication Ser. No. 56-138020 (1981). Further, it is per se conventional to provide, to such a center differential device, a torque distribution control clutch such as a central differential control clutch, which serves for regulating the distribution of the drive torque produced by the engine of the vehicle between the rear wheels of the vehicle (taken as a combination) and the front wheels of the vehicle (taken as a combination). Such a type of construction is disclosed, for example, in Japanese Patent Application Laying Open Publication Ser. No. 50-147027 (1975) and in Japanese Patent Application Laying Open Publication Ser. No. 55-72420 (1980). And such a torque distribution control clutch such as a central differential control clutch is typically controlled by a hydraulically operated servo device, so that the engagement pressure of said torque distribution control clutch, i.e. the maximum amount of torque that said torque distribution control clutch can transmit, which defines the amount of torque redistribution which said torque distribution control clutch can provide between the rear wheels of the vehicle (taken as a combination) and the front wheels of the vehicle (taken as a combination), is regulated by the magnitude of an actuating hydraulic fluid pressure. And such an actuating hydraulic fluid pressure is typically provided by a control system such as a hybrid electrical/hydraulic control system which may include a microcomputer.

Such a central differential device torque distribution control clutch or central differential device action restriction means is typically provided for the following reason. If even one of the vehicle wheels slips, which may well occur especially when the vehicle is being operated upon a bad road surface such as when it is raining, it is snowing, or when the road is muddy, drive power will be lost, whereupon there is the problem that because of the differential effect of the center differential device the drive power of all wheels will be reduced, and the so called trailblazability of the vehicle will be severly deteriorated. In, therefore, a four wheel drive device having a center differential device, such a central differential restriction device is typically provided.

Now, there is an inevitable difference between the front wheel and rear wheel revolution rates for the vehicle, and this front to rear wheels rotational speed difference is determined by, among other factors, the effective radiuses of said front anddn said rear vehicle wheels, as well as by the turning radiuses of said front and said rear vehicle wheels during an episode of turning around a curve or corner. Further, said effective radiuses of said front and said rear vehicle wheels are determined, among other factors, by the inflation pressures of the tires on said front and rear vehicle wheels, by the wear on said tires, and by the current distribution of the load which is being carried by the vehicle, so that in fact a difference between the front wheel and rear wheel revolution rates for the vehicle can occur not only when the vehicle is turning around a curve or corner but also when the vehicle is going along in a relatively straight line. Further, the higher is the vehicle speed, the greater becomes such a difference between the front wheel and rear wheel revolution rates for the vehicle. Therefore, if during relatively high speed vehicle driving the directly coupled four wheel drive state as described above is provided by engaging the central differential action restriction means such as the central differential clutch, thus providing direct coupling together of the front and the rear vehicle wheels, then the difference in the rate of rotation between front and rear wheels, not being absorbed by the differential action of the central differential device, is likely to cause the occurrence of a circulation torque, the so-called screw up torque, and such a screw up torque is typically accompanied by power losses and vibration. Further such screw up torque is necessarily accomodated by slippage of the vehicle tires upon the road surface, which not only deteriorates the gripping effect of the vehicle wheels upon the road surface but also increases tire wear and deteriorates vehicle fuel consumption.

Now, a concept for controlling the operation of such a central differential device operation restriction clutch has been outlined in Japanese Patent Application Ser. No. 60-280662 (1985), which it is not intended hereby to admit as prior art to the present patent application except to the extent in any case required by applicable law, as follows: the maximum torque transmission capacity of said central differential device operation restriction clutch is increased (so as to provide more restriction of the operation of said central differential device) according to the torque on the input shaft to said central differential device, as well as according to the engaged speed stage of a gear transmission mechanism provided before said central differential device in the power train of the vehicle. However, this operational concept does not necessarily cover all cases of operation: for example, a problem arises when the vehicle is accelerating: when the accelerator pedal of the vehicle is depressed and the engine power output is high, the central differential device becomes locked up according to the operation of its said clutch, and the drive torque is distributed between the front vehicle wheels and the rear vehicle wheels according to the dynamic load distribution, so that the trailblazability and the steerability of the vehicle are improved; but, in high speed vehicle operation with the engine load relatively large, since the operation of the central differential device is still subject to restriction, when there is a difference in the effective radiuses of the front vehicle wheels and the rear vehicle wheels due to loading irregularities of the vehicle or variant tire inflation or wear or the like, then as described above so-called screw up torque will necessarily occur, causing power losses and vibration, slippage of the vehicle tires upon the road surface, thus deteriorating the gripping effect of the vehicle wheels upon the road surface and also increasing tire wear and deteriorating vehicle fuel consumption.

SUMMARY OF THE INVENTION

The inventors of the present invention have considered the various problems detailed above in the aforementioned type of four wheel drive type vehicle incorporating such a four wheel drive power transmission system.

Accordingly, it is the primary object of the present invention to provide an improved vehicle central differential operation restriction device control device for a four wheel drive type vehicle, and a corresponding method for operating such a device, which avoid the problems detailed above.

It is a further object of the present invention to provide such a vehicle central differential operation restriction device control device and method, which ensure that, especially on bad roads and the like, even if slippage of one or of a plurality of vehicle wheels with respect to the road surface being driven on occurs, good trailblazability can be provided.

It is a further object of the present invention to provide such a vehicle central differential operation restriction device control device and method, which ensure good vehicle operational characteristics.

It is a further object of the present invention to provide such a vehicle central differential operation restriction device control device and method, which ensure that circulation torque or screw up torque is not substantially set up.

It is a yet further object of the present invention to provide such a vehicle central differential operation restriction device control device and method, which ensure good vehicle operational power.

It is a yet further object of the present invention to provide such a vehicle central differential operation restriction device control device and method, which help to minimize vehicle vibration.

It is a yet further object of the present invention to provide such a vehicle central differential operation restriction device control device and method, which ensure good vehicle tire life.

It is a yet further object of the present invention to provide such a vehicle central differential operation restriction device control device and method, which maximize vehicle fuel consumption.

According to the most general device aspect of the present invention, these and other objects are attained by, for a four wheel drive vehicle with two front wheels, two rear wheels, an engine, and a central differential device, rotational power from said engine being provided via said central differential device to the combination of the front wheels of said vehicle and also to the combination of the rear wheels of said vehicle, and further comprising a device for selectively restricting the operation of said central differential device: a central differential operation restriction device control device, comprising: (a) a means for detecting a condition representative of the road speed of said vehicle and of the load on said engine; and: (b) a means for controlling said device for selectively restricting the operation of said central differential device, so that: said operation of said central differential device is less restricted than otherwise, when said vehicle speed is relatively high and also said engine output is not relatively high; and, according to the most general method aspect of the present invention, these and other objects are attained by, for a four wheel drive vehicle with two front wheels, two rear wheels, an engine, and a central differential device, rotational power from said engine being provided via said central differential device to the combination of the front wheels of said vehicle and also to the combination of the rear wheels of said vehicle, and further comprising a device for selectively restricting the operation of said central differential device: a central differential operation restriction device control method, wherein: (a) a condition representative of the road speed of said vehicle and of the load on said engine is detected; and: (b) said device for selectively restricting the operation of said central differential device is controlled, so that: said operation of said central differential device is less restricted than otherwise, when said vehicle speed is relatively high and also said engine output is not relatively high.

The differential restriction device used for the application of the control device and the control method according to the present invention is typically capable of varying freely its maximum torque transmission capacity in response to an external control signal, and as this differential restriction device may be used a hydraulic servo type of wet multi plate clutch, an electromagnetic powder clutch, or the like.

According to such a device and such a method as described above, when said vehicle speed is relatively high and also said engine output is not relatively high, i.e. in relatively high speed normal driving vehicle operation, the device (such as a clutch) for selectively restricting the operation of said central differential device is controlled so as to less restrict said operation of said central differential device, and a certain degree of differential action of said central differential device is thereby allowed, thereby preventing the occurrence of the directly coupled front vehicle wheels and rear vehicle wheels condition. In such an operational mode, rotational speed differences between the front vehicle wheels and the rear vehicle wheels, as for example due to differences in their effective radiuses due to tire inflation abnormalities or the like, are absorbed, and accordingly the occurrence of the screw up torque phenomenon is prevented, as a result of which tire wear is minimized and vehicle fuel consumption is maximized; and also noise and vibration are reduced. On the other hand, in other operational circumstances, such as for example when the vehicle road speed is relatively low and the load on the vehicle engine is relatively high as when the vehicle is being accelerated, the device (such as a clutch) for selectively restricting the operation of said central differential device is controlled so as to more restrict said operation of said central differential device, and accordingly good driving power is supplied to all of the four vehicle wheels even if one or more of them is/are undergoing slippage as for example due to poor road conditions, and thereby good trailblazability and good accelerability of the vehicle are obtained. In other words, according to the present invention as defined above, the operational conditions of the vehicle are appropriately reflected in the degree of central differential inhibition which is provided, as a result of which the vehicle is provided with good steerability and accelerability, and also rotational speed differences during high speed vehicle operation are effectively absorbed, thus providing good tire durability and the like.

The condition representative of the road speed of said vehicle and of the load on said engine may be the engagement of the highest speed stage of a gear transmission mechanism which is provided in the rotational power transmission path between the engine and the central differential device. In such a case, typically said means for controlling said device for selectively restricting the operation of said central differential device will do so in such a manner that said operation of said central differential device is less restricted than otherwise, when said highest speed stage of said gear transmission mechanism is engaged. If, in such a case, the timing of switching over of control of said device for selectively restricting the operation of said central differential device is coordinated with the timing of shifting of engagement of said gear transmission mechanism so as to at least partially overlap the individual torque shocks caused thereby, thereby significant operational advantages with regard to vehicle comfort and durability will be attained. Alternatively, said condition representative of the road speed of said vehicle and of the load on said engine may be the engagement of the highest speed stage of such a gear transmission mechanism which is provided in the rotational power transmission path between the engine and the central differential device and the simultaneous engagement of a lock up clutch which is provided to a torque converter which is further provided in the rotational power transmission path between said engine and said gear transmission mechanism. In such a case, typically said means for controlling said device for selectively restricting the operation of said central differential device will do so in such a manner that said operation of said central differential device is less restricted than otherwise, when said highest speed stage of said gear transmission mechanism is engaged and also said lock up clutch is engaged. In these cases, since the engagement of the central differential operation restriction means is carried out according to the operation of the gear transmission mechanism and optionally further of the lock up clutch, the needs for any special vehicle speed sensor or engine load sensor are evaded, and this type of control concept can be provided not only with an electrical type of control system but also with a hydraulic type control system. Yet alternatively, said condition representative of the road speed of said vehicle and of the load on said engine may be the combination of the actual road speed of said vehicle and of the actual load on said engine. In such a case, said means for controlling said device for selectively restricting the operation of said central differential device may typically do so in such a manner that said operation of said central differential device is more restricted, when said actual load on said engine is the larger; and more particularly may do so in such a manner that when said actual load on said engine is at least a determinate engine load value, said operation of said central differential device is selectively restricted, according to the actual road speed of said vehicle. In this case, such restriction according to the actual road speed of said vehicle may be that, when said actual load on said engine is at least said determinate engine load value, said operation of said central differential device is more restricted, when said actual road speed of said vehicle is lower; and more particularly may be that said means for controlling said device for selectively restricting the operation of said central differential device does so in such a manner that, when said actual load on said engine is at least said determinate engine load value, said operation of said central differential device is restricted, when said actual road speed of said vehicle is lower than a determinate vehicle road speed value.

BRIEF DESCRIPTION OF THE DRAWINGS

The present invention will now be described with respect to the preferred embodiments of the device and of the method thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and chambers and flow chart steps and so on in the various figures relating to one preferred embodiment, and like parts and chambers and flow chart steps and so on in the various figures relating to different preferred embodiments; and:

DESCRIPTION OF THE PREFERRED EMBODIMENTS

The present invention will now be described with reference to the preferred embodiments of the device and of the method thereof, and with reference to the figures.

Overall Vehicle Power Train Structure

Figure 1:
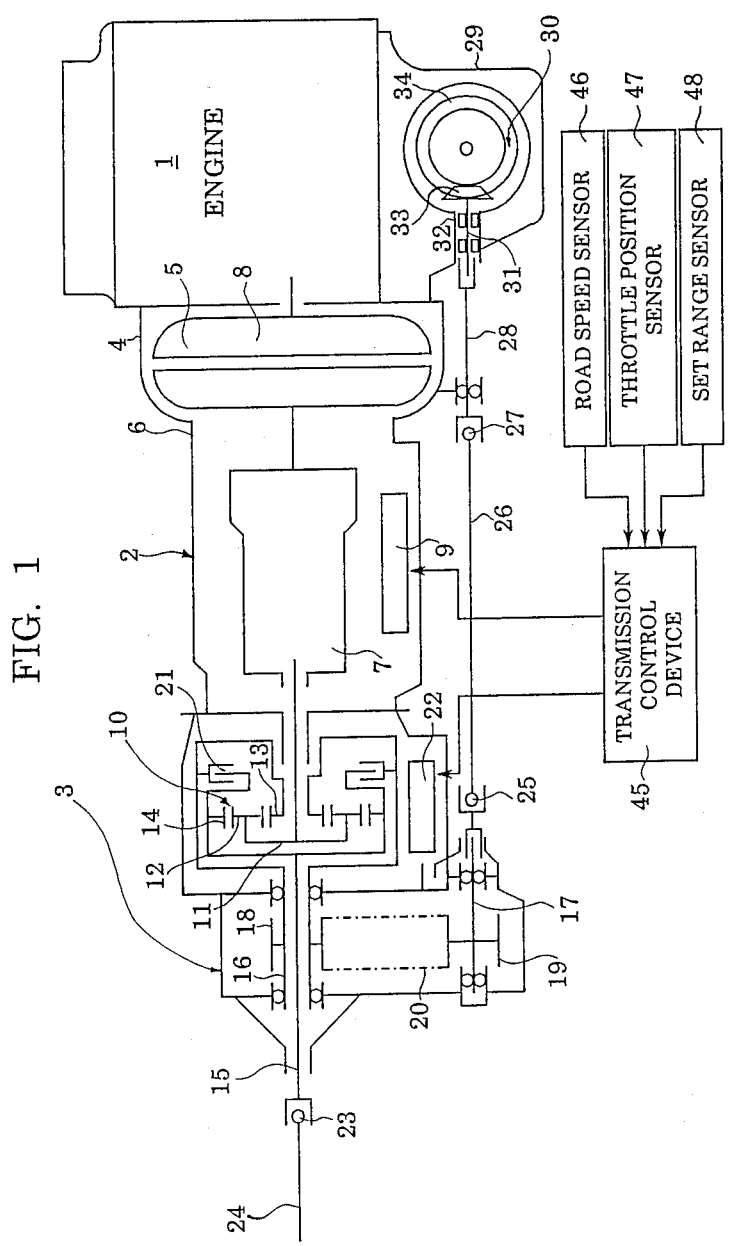
FIG. 1 is a schematic longitudinal skeleton view of a vehicle power train and of a control system therefor which incorporates the first preferred embodiment of the vehicle central differential operation restriction device control device of the present invention, for practicing the first preferred method embodiment.

FIG. 1 is a schematic longitudinal skeleton view of a power train of a vehicle, which incorporates the first preferred embodiment of the control device of the present invention for controlling a four wheel drive vehicle central differential operation restriction device, said control device performing the first preferred method embodiment. In this figure, the reference numeral 1 denotes an internal combustion engine of the vehicle, which is mounted, in this exemplary case, longitudinally in the front engine room (not particularly shown) of said vehicle. And the reference numeral 2 denotes an automatic speed change device (automatic transmission) of a per se known type mounted to the rear of the engine 1, while 3 denotes a four wheel drive power transfer device which is always operating in so called full time four wheel drive mode, so as always to drive both the rear pair of wheels of the vehicle and also the front pair of wheels of the vehicle, albeit with the differential action provided by this four wheel drive power transfer device 3 being selectably either not provided at all, being provided to a limited degree, or being fully provided, as will be explained in detail hereinafter.

In more detail, the automatic speed change device 2 incorporates a fluid torque converter 5 of a per se known construction, and the power input member 8 of this fluid torque converter 5 is connected via an input shaft to and receives rotational power from a crank shaft of the internal combustion engine 1. And the fluid torque converter 5 is housed within a torque converter housing 4 which is fitted against and is secured to the main body of the internal combustion engine 1, while the automatic speed change device 2 comprises a gear transmission mechanism 7, which is likewise housed within a speed change device housing 6 fitted against and secured to the torque converter housing. And the input shaft of the gear transmission mechanism 7 is connected to and receives rotational power from the power output shaft of the fluid torque converter 5; and thereby the gear transmission mechanism 7 receives rotational power from the internal combustion engine 1, with a certain degree of slippage and also torque amplification being provided for said rotational power by the fluid torque converter 5 (unless a lock up clutch thereof, if provided thereto, is activated; such arrangements are not particularly shown) as is per se conventional. This gear transmission mechanism 7 may for the purposes of this specification be of a per se known type incorporating various planetary gear mechanisms and friction engaging mechanisms such as clutches and brakes, and, according to selective actuation of said friction engaging mechanisms provided in a per se known manner by an electrically controlled electric/hydraulic control mechanism 9 of a per se known sort including various speed change valves and/or solenoids and so on, provides any one of a plurality of speed reduction stages between its said power input shaft and its power output shaft, its said power output shaft driving the four wheel drive power transfer device 3.

This four wheel drive power transfer device 3 incorporates a center differential device 10 of a planetary gear wheel type for providing full time differential action between the front wheels of the vehicle and the rear wheels of the vehicle during the full time four wheel drive operation thereof. Now the detailed construction of this center differential device 10 will be explained. It comprises a sun gear 13, a ring gear 14, a carrier 11, and a plurality of planetary pinions 12 which are rotatably mounted to said carrier 11 and are meshed between the sun gear 13 and the ring gear 14 and which perform planetary movement between the same in a per se known manner. The carrier 11 functions as an input member for this center differential device 10, and said carrier 11 is rotationally connected to the output shaft of the gear transmission mechanism 7 via a transfer shaft which passes through a central axial hole which is pierced through the hollow sun gear 13. The ring gear 14 functions as one power output member for the center differential device 10 for supplying power to the rear wheels of the vehicle, and said ring gear 14 is rotationally connected to a rear wheel power output shaft 15 which extends out of the four wheel drive power transfer device 3 in the direction to the left as seen in FIG. 1, i.e. towards the rear of the vehicle in this particular exemplary implementation. And the sun gear 13 functions as another power output member for the center differential device 10 for supplying power to the front wheels of the vehicle, and is rotationally connected to a sleeve shaped intermediate front wheel drive shaft 16, via a drum member which fits around the entire differential device. This intermediate front wheel drive shaft 16 is formed as a tubular hollow member which is fitted around the rear wheel power output shaft 15, and on its outside there is fixedly mounted a sprocket wheel 18. An endless chain 20 is fitted around this sprocket wheel 18 and also around another sprocket wheel 19 provided below said sprocket wheel 18, from the point of view of the figure and in the actual vehicle body also, and wheel 19 provided below said sprocket wheel 18, from the point of view of the figure and in the actual vehicle body also, and the central axis of this sprocket wheel 19 extends parallel to the central axis of the sprocket wheel 18. This sprocket wheel 19 is fixedly mounted on one end of a front wheel power output shaft 17, the other end of which protrudes from the housing of this four wheel drive power transfer device 3 in the rightwards direction in the figure, i.e. towards the front end of the vehicle in this particular exemplary implementation.

Thus, the power distribution ratio (drive torque distribution) between the intermediate front wheel drive shaft 16 and the rear wheel power output shaft 15, when this four wheel drive power transfer device 3 is operating freely (i.e. when a clutch 21 to be described shortly is in the fully released condition), is determined by the relative tooth counts of the sun gear 13 and the ring gear 14 by the expressions $Rr = 1/(1 + Rg)$ and $Rf = Rg(1 + Rg)$, where Rr is the rear wheel distribution ratio, Rf is the front wheel distribution ratio, and Rg is the ratio of the number of teeth on the sun gear 13 to the number of teeth on the ring gear 14. Because the number of teeth on the sun gear 13 is naturally greater than the number of teeth on the ring gear 14, thus, providing that the number of teeth on the sprocket wheel 18 and the number of teeth on the sprocket wheel 19 are the same, and the gearing ratios of the differential devices for the front pair of vehicle wheels and for the rear pair of vehicle wheels are the same, this four wheel drive power transfer device 3 is of the type which distributes a larger amount of torque to the rear vehicle wheels than to the front vehicle wheels.

Within the four wheel drive power transfer device 3 there is provided a hydraulically operated wet type clutch 21, which selectively rotationally connects together the sun gear 13 and the ring gear 14, either completely or partially, or alternatively allows said members to rotate freely with respect to one another. This wet clutch 21, the construction and the actuation of which will be explained in some detail shortly, is selectively operated to a greater or lesser engagement extent (this expression relates to the maximum torque transmission capability of said wet clutch 21) by supply of actuating hydraulic fluid pressure of a greater or lesser pressure value from an electrically actuated electric/hydraulic control device 22, an exemplary construction for which will be outlined hereinafter. Accordingly, the four wheel drive power transfer device 3, which receives rotational power input from the gear transmission mechanism 7 and outputs said rotational power to the rear wheel power output shaft 15 and to the front wheel power output shaft 17, can be caused either to provide (in the case that the wet clutch 21 is fully disengaged) substantially free differential action for distributing said rotational power between said rear wheel power output shaft 15 and said front wheel power output shaft 17, or not to provide (in the case that the wet clutch 21 is fully engaged) any such differential action at all and just to drive said shafts 15 and 17 independently, or to provide (in the case that the wet clutch 21 is partially but not fully engaged) a condition intermediate between these two extreme conditions, so as to partly allow the center differential device 10 to provide its differential action for distributing said rotational power between said rear wheel power output shaft 15 and said front wheel power output shaft 17 to some extent, while being somewhat impeded by the dragging action of the clutch 21, up to a certain maximum dragging action amount, which is determined by the maximum torque transmission capacity of said wet clutch 21 in the particular operational circumstances.

Via a universal joint 23 of a per se known sort, the rear end of the rear wheel power output shaft 15 rotationally drives the front end of a rear wheel propeller shaft 24. And the rear end of this rear wheel propeller shaft 24 is connected via another universal joint (not particularly shown) to a differential device, (not particularly shown either), for driving the rear wheels (also not shown) of the vehicle.

And, via a universal joint 25 also of a per se known sort, the front end of the front wheel power output shaft 17 rotationally drives the rear end of a front wheel propeller shaft 26. Thus, this front wheel propeller shaft 26 extends alongside and generally below the casing 6 of the automatic speed change device 2 including the fluid torque converter 5 therein, roughly parallel to the longitudinal axis thereof and on one side thereof. The front end of this front wheel propeller shaft 26 is rotationally connected, via another universal joint 27 also of a per se known sort, via a short intermediate shaft 28 which is supported from the torque converter casing by means of a bearing assembly, and via yet another universal joint also of a per se known sort, to the outer end of a drive pinion shaft 31 which constitutes the power input shaft of a front differential device 30 which drives the front wheels (not shown) of the vehicle. And this drive pinion shaft 31 is also rotatably supported at its intermediate portion from the casing 32 of the front differential device 30 (this casing 32 is integrally formed with the oil pan of the internal combustion engine 1), and the inner end of this drive pinion shaft 31 is provided with a drive pinion 33 which is constituted as a bevel gear, with said drive pinion 33 being meshingly engaged with a driven ring gear 34 of the front differential device 30.

Operation of this Power Train

This vehicle power train operates as follows. When the clutch 21 of the four wheel drive power transfer device 3 is operated by the electrically actuated electric/hydraulic control device 22 so as not all to rotationally connect together the sun gear 13 and the ring gear 14, so that said clutch 21 is fully disengaged, then the center differential device 10 functions so as to provide its differential effect between the rear wheel power output shaft 15 and the intermediate front wheel drive shaft 17 in full measure, i.e. so as to receive rotational power provided by the engine 1 of the vehicle and transmitted to said four wheel drive power transfer device 3 via the automatic speed change device 2, and to distribute said rotational power, while providing a non damped differential effect, between the rear wheels of the vehicle taken as a combination and the front wheels of the vehicle taken as a combination. On the other hand, when the clutch 21 of the four wheel drive power transfer device 3 is operated by the electrically actuated electric/hydraulic control device 22 so as to completely rotationally connect together the sun gear 13 and the ring gear 14, i.e. so as to be fully engaged and so as to provide an effectively unlimited degree of torque transmission, then the center differential device 10 functions so as to provide no such differential effect at all between the rear wheel power output shaft 13 and the intermediate front wheel drive shaft 14, i.e. so as to distribute the rotational power provided from the engine 1 via the automatic speed change device 2 directly to the rear wheels 24 of the vehicle taken as a combination and also to the front wheels 8 of the vehicle taken as a combination in an even fashion without any provision of any differential effect at all. And, in the intermediate case between these two extremes, when said clutch 21 of said four wheel drive power transfer device 3 is operated by said electrically actuated electric/hydraulic control device 22 so as somewhat to rotationally connect together said sun gear 13 and said ring gear 14, i.e. so as to be partially but not fully engaged and so as to provide a certain relatively limited degree of dragging or torque transmitting effect between these members, then said center differential device 10 functions so as to provide its differential effect between said rear wheel power output shaft 15 and said intermediate front wheel drive shaft 17 to a relatively limited or partial degree, i.e. so as to receive rotational power provided by said engine 1 of said vehicle and transmitted to said four wheel drive power transfer device 3 via said automatic speed change device 2, and to distribute said rotational power, while providing a partially damped differential effect, between said rear wheels of said vehicle taken as a combination and said front wheels of said vehicle taken as a combination.

The Central Differential Control Clutch 21 and its Actuating System

Figure 2:
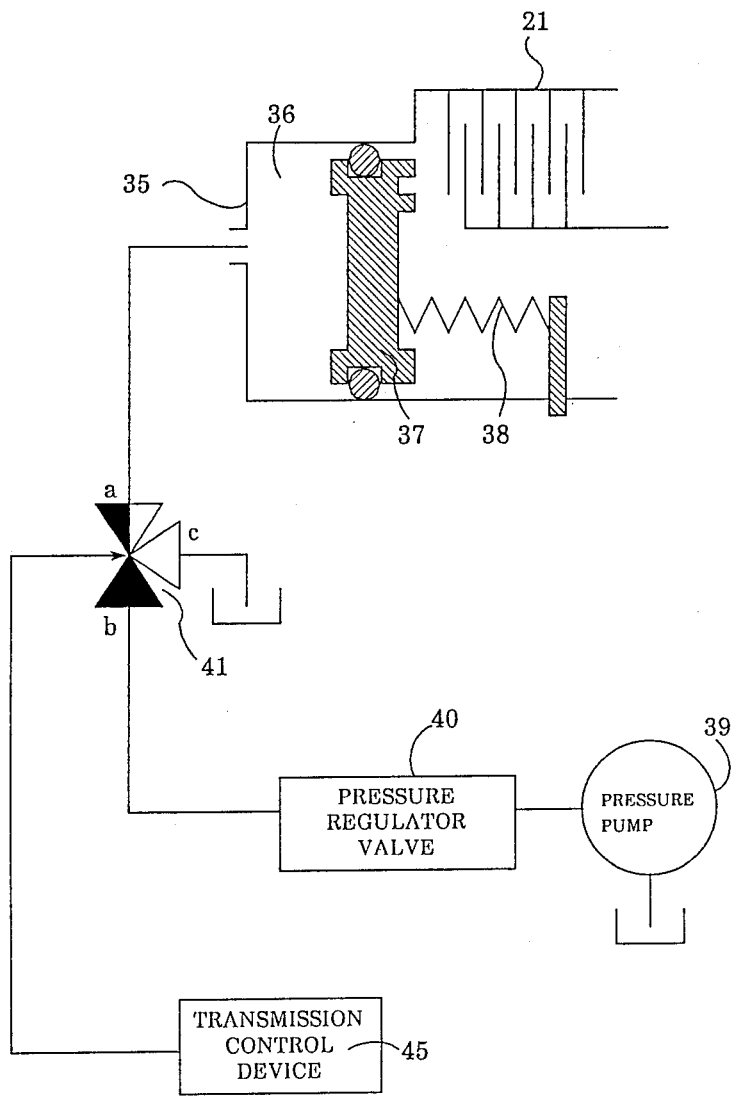
FIG. 2 is a partially longitudinal sectional partially schematic block diagrammatical view of a torque transfer clutch which is provided to a center differential device of the FIG. 1 power train, and of an actuating servo device for said torque transfer clutch, for showing details of their constructions, said torque transfer clutch and said actuating servo device therefor being controlled by said first preferred embodiment of the vehicle central differential operation restriction device control device of the present invention, according to the first method embodiment.

In FIG. 2, there is shown a schematic partly cross sectional view of the central differential control clutch 21 of the four wheel drive power transfer device 3, and of an actuating system including a servo device 35 for said clutch 21, as incorporated in the shown central differential operation restriction device, to which the first preferred embodiment of the control device therefor of the present invention is applied; however, this particular arrangement should not be taken as unduly limitative of the present invention, as other possibilities for these structures could also be implemented, in alternative constructions. In this figure, the central differential control clutch 21 is shown as being a hydraulic servo type wet clutch, comprising two sets of mutually interleaved and sandwiched together clutch plates, one of said clutch plates sets being rotationally fixed with respect to the sun gear 13 of the center differential device 10, while the other said set of clutch plates are rotationally fixed with respect to the ring gear 14 of said center differential device 10. Thus, when these two sets of clutch plates are squeezed together by the servo device 70 as will be explained in detail shortly, a maximum torque transmission capability between the sun gear 13 and the ring gear 14 of the center differential device 10 is provided in a degree corresponding to the degree of squeezing together of said two sets of clutch plates, i.e. in a degree corresponding to the total force acting to squeeze the sandwich of said sets of clutch plates together.

The servo device 35 provided for thus pressing and squeezing together said sets of clutch plates comprises a pressure chamber 36 and a servo piston 37, all of these members and chambers being annular. The servo piston 37 confronts the two sandwiched together sets of clutch plates, for opposing said clutch plate sets and for pressing them together, when said servo piston is biased in the direction towards said clutch plate sets (rightwards in FIG. 2). And, when the pressure chamber 36 is pressurized with hydraulic fluid, it presses the servo piston 37 against the clutch plate sets 66 and 68 in this way, and squeezes them together. A spring 38, which in fact is an annular spring and which bears upon a spring retainer member, is provided for biasing said servo piston 37 in the leftwards direction as seen in FIG. 2, so as to reduce the size of the pressure chamber 36. Thereby, when no substantial hydraulic fluid pressure is supplied to said pressure chamber 36, under the biasing action of the spring 38 the servo piston 37 is biased in the leftwards direction as seen in the drawing, so as to not substantially compress the superposed sandwich of the clutch plate sets and thus to let said clutch plate sets be not substantial mutually engaged; and, thereby, no substantial degree of torque transmission between the sun gear 13 and the ring gear 14 of the center differential device 10 is provided. On the other hand, when a substantial degree of hydraulic fluid pressure is supplied to the pressure chamber 36, the servo piston 37 is biased, against the biasing action of the spring 38 which is overcome, in the rightwards direction as seen in the drawing, so that said servo piston 37 presses against and compresses together the superposed sandwich of the clutch plate sets with a force determined according to the magnitude of the pressure value supplied to said pressure chamber 36, thereby causing said clutch plate sets to be mutually engaged together with a maximum torque transmission capability which is determined according to said magnitude of said pressure value supplied to said pressure chamber 36; and, thereby, a maximum torque transmission capability is provided between the sun gear 13 and the ring gear 14 of the center differential device 10, similarly with a magnitude determined according to the magnitude of the pressure value supplied to the pressure chamber 36.

The electrically actuated electric/hydraulic control device 22, to define its action in a functional sense, supplies a hydraulic fluid pressure of any desired pressure level from substantially zero up to line pressure to the pressure chamber 36 of this servo device 35, according to the value of an electrical control signal supplied to it; this electric signal may be a pulse signal, and the duty ratio of said pulse signal may control the pressure supplied said pressure chamber 36 of the servo device 35, for example. Thus, by varying the value of said electrical signal, it is possible to vary the degree of torque transmission between the sun gear 13 and the ring gear 14 of the center differential device 10 between substantially zero and a substantially maximum value. In the suggested exemplary construction shown in FIG. 2, the electrically actuated electric/hydraulic control device 22 comprises an electromagnetically actuated hydraulic switching valve 41, which receives supply at its port designated in the figure as "b" of hydraulic fluid pressurized by a pressure pump 39 (incorporated in the automatic transmission 2) and pressure regulated by a pressure regulator valve 40, whose port designated in the figure as "a" is connected to the pressure chamber 36 of the servo device 35 for supplying pressurized hydraulic fluid to said pressure chamber 36, and whose port designated in the figure as "c" is connected to a drain. This electromagnetically actuated hydraulic switching valve 41 is so constituted that when actuating electrical energy is supplied to a solenoid or the like incorporated therein it communicates its port "a" to its port "b" while not communicating its port "c" to any other port; while, on the other hand, when no such actuating electrical energy is supplied to said solenoid or the like of said electromagnetically actuated hydraulic switching valve 41, said electromagnetically actuated hydraulic switching valve 41 communicates its port "a" to its port "c" while not communicating its port "b" to any other port. Thereby, by the electromagnetically actuated hydraulic switching valve 41 being supplied with a pulse type controlling electrical signal, said electromagnetically actuated hydraulic switching valve 41 supplies a pressure value to the pressure chamber 36 of the servo device 35 which is determined according to the duty ratio of said pulse electrical signal. This controlling pulse electrical signal is supplied from a transmission control device 45, now to be explained.

The Transmission Control System

Referring to FIG. 1, it will be seen that the following detectors and sensors are provided to this system. A road speed sensor 46 detects a value representative of the road speed of the vehicle by measuring the rotational speed of a member rotationally coupled to the rear wheel power output shaft 15, or the like, and outputs an electrical signal representative thereof. A throttle position sensor 47 detects a value representative of the current load on the internal combustion engine 1 by measuring the opening angle (which will be referred to hereinafter as "Theta") of the throttle valve (not particularly shown) of a carburetor (not shown either) of said engine 1, and outputs an electrical signal representative thereof. And a set range sensor 48 detects the set position of a manual range settoutputs an electrical signal representative thereof. And a set range sensor 48 detects the set position of a manual range setting valve which is provided for the transmission mechanism 2, or of a setting means therefor, and outputs an electrical signal representative thereof; this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 2 such as "D" range, "2" range, "L" range, "R" range, "N" range, and "P" range. The output signals of these three sensors 46, 47, and 48 are fed to a transmission control device 45.

This transmission control device 45 outputs control signals for controlling the electric/hydraulic control device 22 for the four wheel drive power transfer device 3 and the electrical/hydraulic control mechanism 9 for the gear transmission mechanism 7, according to principles which incorporate the concept of the first preferred embodiments of the vehicle central differential operation restriction device control device and method of the present invention, as will be explained hereinafter. No concrete illustration of the structure of any particular realization of the transmission control device 45 will be given herein, since various possibilities for the details thereof can be easily supplemented by one of ordinary skill in the electronic and computer programming art based upon the functional disclosures set out in this specification. In the preferred embodiments of the device and the method of the present invention, the transmission control device 45 is concretely realized as a micro computer and its associated circuitry, said micro computer operating at the behest of a control program which will not be completely detailed, since the details thereof which are not disclosed herein can likewise be easily supplemented by one of ordinary skill in the electronic and computer programming art based upon the functional disclosures set out in this specification. However, it should be particularly understood that such realizations in the micro computer form, although preferred, are not the only ways in which the transmission control device 45 can be provided; in other possible embodiments it could be constituted as an electrical device not incorporating a microprocessor. In the preferred case, however, such a microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and/or switches 46 through 48 to the input port device, and drive circuits through which actuating electrical signals are passed from the output port device to a speed change control solenoid or solenoids of the electrical/hydraulic control mechanism 9 for controlling the automatic speed change device 2 and to the solenoid or the like of the electromagnetically actuated hydraulic switching valve 41 of the electric/hydraulic control device 22 for controlling the torque transmission capacity of the clutch 21 of the four wheel drive power transfer device 3 by supplying appropriate hydraulic fluid pressure to the pressure chamber 36 of the servo mechanism 35. It should be understood that the transmission control device 45 generally functions so as to engage an appropriate one of the various speed stages of the gear transmission mechanism 7 of the transmission mechanism 2 according to the current values of vehicle operating parameters such as the vehicle road speed as sensed by the road speed sensor 46, the engine load (throttle opening theta) as sensed by the throttle position sensor 47, and the operating range of the transmission as manually set by the vehicle driver on the setting means therefore as sensed by the set range sensor 48; such a transmission shift stage selection function may be performed in a per se conventional way, and no particular details thereof will be shown or suggested in this specification, since various possibilities for the details thereof can be easily supplemented as appropriate by one of ordinary skill in the transmission control and the programming arts, particularly when based upon the functional disclosures set out in this specification. Further, said transmission control device 45 generally functions as will now be explained, so as to control the torque transmission capacity of the clutch 21 of the center differential device 10 of the four wheel drive power transfer device 3, according to the current values of the road speed of the vehicle as sensed by the road speed sensor 46, and the load on the engine 1 of the vehicle as sensed by the throttle position sensor 47 and as represented by the throttle opening theta.

The Control According to the First Method Embodiment

In detail, in this first preferred emboidment, the maximum torque transmission capacity Tc of the clutch 21 of the center differential device 10 of the four wheel drive power transfer device 3 is determined according to the current value of the road speed V of the vehicle and the current value of the throttle opening theta of the engine 1 of the vehicle, so that, for the same road speed V the larger is the throttle opening theta the larger is the torque transmission capacity Tc, and for the same throttle opening theta the larger is the road speed V the not larger (and maybe smaller) is the torque transmission capacity Tc. The aim of this control is for the maximum torque transmission capacity Tc of the clutch 21 of the center differential device 10 of the four wheel drive power transfer device 3 to be reduced, during periods of rapid vehicle acceleration, which are typically to be identified by the throttle opening theta being relatively large while the road speed V is relatively small or at least not relatively large. On the other hand, when the throttle opening theta is relatively small, then of course the vehicle is not being rapidly accelerated, whatever be the value of the road speed V; and, even if the throttle opening theta is relatively large, if also the road speed V is relatively large, then it is not typically the case that the vehicle is being rapidly accelerated.

Figure 3:
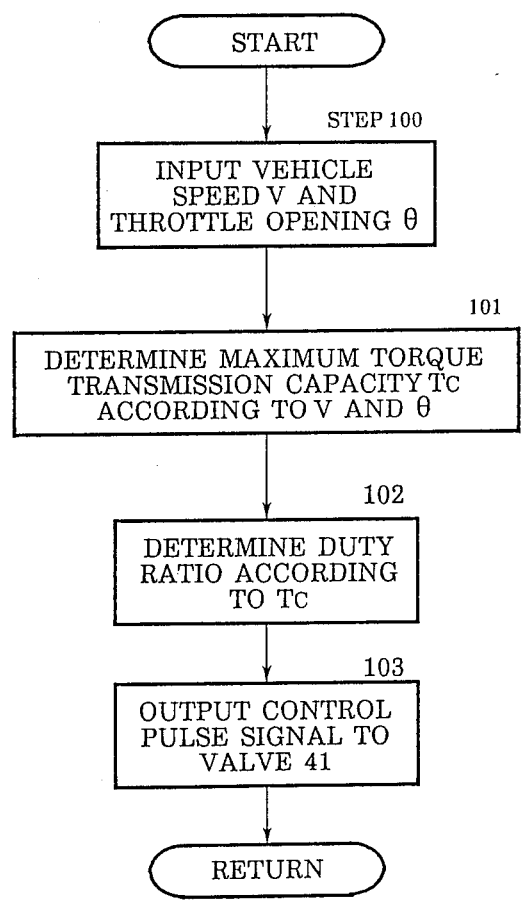
FIG. 3 is a fragmentary flow chart for showing the operation of this first preferred method embodiment, illustrating the flow of a program which is obeyed by a transmission control device which is shown by a block in FIG. 1 and is included in this first preferred device embodiment.

FIG. 3 shows a fragmentary flow chart for a portion of the aforementioned control program which directs the operation of the transmission control device 45, according to this first preferred embodiment of the four wheel drive vehicle central differential operation restriction device control device of the present invention, so as to realize the first preferred embodiment of the four wheel drive vehicle central differential operation restriction device control method of the present invention. This flow chart will now be explained; no particular programming steps for implementing said flow chart are shown or suggested in this specification, since various possibilities for the details thereof can be easily supplemented as appropriate by one of ordinary skill in the programming art, particularly when based upon the functional disclosures set out in this specification. The flow chart of FIG. 3 only shows the portion of the control program of the transmission control device 45 which controls the supply of actuating hydraulic fluid pressure to the clutch 21 of the center differential device 10 of the four wheel drive power transfer device 3, i.e. to the electrically actuated electric/hydraulic control device 22, and further only shows this process in schematic form; said FIG. 3 flow chart therefore does not show the portion of said control program relating to the control provided for the gear transmission mechanism 7 of the transmission mechanism 2. This fragment will be sufficient for exemplifying the principles of the present invention. This program portion is executed at regular intervals of for example a few milliseconds, of course after the engine 1 is started as the vehicle incorporating it is driven.

In this flow chart, first in the step 100 the transmission control device 45 inputs the current value of the road speed of the vehicle as sensed by the road speed sensor 46, and the current value of the throttle opening theta of the engine 1 of the vehicle as sensed by the throttle position sensor 47.

Figure 4:
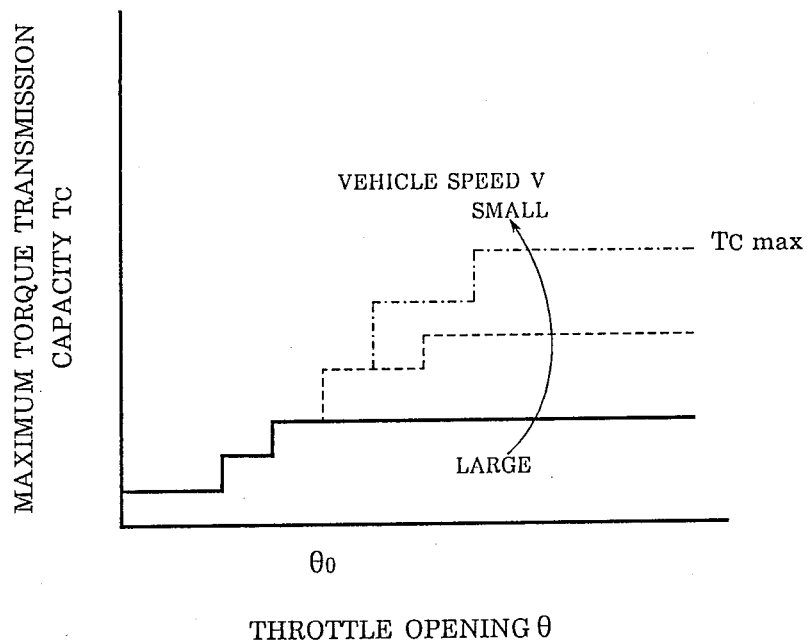
FIG. 4 is a graph which shows along the vertical axis the magnitude of the maximum torque transmission capacity Tc which is being caused to be provided between two clutch plate sets of the FIG. 2 torque transfer clutch by their being squeezed together according to the pressure of a piston member upon them, and which shows along the horizontal axis the opening theta of a throttle of the engine of the vehicle.

Next, in the step 101, said transmission control device 45 determines an appropriate value for the maximum torque transmitting capacity Tc of the clutch 21, as determined according to said vehicle road speed V and said throttle opening theta; this may be done, for example, by storing a map comprising a predetermined value of Tc for various pairs of values of vehicle road speed V and throttle opening theta, or alternatively by calculation using some algorithm or other based upon the values of the vehicle road speed V and the throttle opening theta, or again alternatively by a combination of these two concepts. For example, the determination of the maximum torque transmitting capacity Tc of the clutch 21 may be performed according to the graph shown in FIG. 4, in which said maximum torque transmission capacity Tc of said clutch 21 is shown along the vertical axis and said throttle opening theta is shown along the horizontal axis. In this illustrative case, when theta is below a determinate value theta0, the maximum torque transmission capacity Tc of the clutch 21 is increased along with increase of the throttle opening theta, in order to restrict the operation of the center differential device 10 of the four wheel drive power transfer device 3 at this time; whereas, when theta is above said determinate value theta0, the maximum torque transmission capacity Tc of the clutch 21 is increased along with decrease of the vehicle road speed V.

Next, in the step 102, the transmission control device 45 determines an appropriate duty ratio for the pulse electrical signal which it needs to supply to the solenoid or the like of the electromagnetically actuated hydraulic switching valve 41, in order to provide such a maximum torque transmission capacity Tc of the clutch 21.

And, next and finally, in the step 103, said transmission control device 45 actually outputs such a pulse electrical signal, of duty ratio as determined in the previous step, to the solenoid or the like of the electromagnetically actuated hydraulic switching valve 41, thereby controlling the value of the hydraulic fluid pressure supplied to the chamber 36 of the servo device 35 for said clutch 21, so as to provide said determined maximum torque transmission capacity Tc for the clutch 21 of the center differential device 10 of the four wheel drive power transfer device 3. And then the flow of control passes to leave this FIG. 3 program fragment, without doing anything further.

And, by the repeated performance of the FIG. 3 program fragment at regular and relatively brief intervals, the maximum torque transmission capacity Tc of the clutch 21 is set as appropriate, in all operational circumstances.

In other words, the larger is the value of the throttle opening theta of the engine 1 (i.e., the larger is the load on said engine 1), and the lower is the value of the vehicle road speed V, the greater is the maximum torque transmission capacity Tc of the clutch 21, so that the more is the differential effect of the center differential device 10 of the four wheel drive power transfer device 3 restricted, and thereby in the case of sudden vehicle acceleration when the vehicle road speed is relatively low a condition of more or less directly coupled four wheel drive operation is attained, with said center differential device 10 being substantially completely locked up and the rotation of the front wheels and the rotation of the rear wheels being substantially directly coupled together, thus giving high vehicle sudden acceleration drivability and steerability. On the other hand, when the vehicle speed V is relatively high, then a large value of the throttle opening theta does not necessarily imply rapid vehicle acceleration, and therefore in this case the maximum torque transmitting capacity of the clutch 21 is kept as relatively low, so that the operation of the center differential device 10 is not very much restricted, and therefore no problem occurs of excessive tire wear or high fuel consumption of the vehicle. Thereby, the operation characteristics of the vehicle are maintained as good, while the sudden acceleration drivability and steerablity of the vehicle are also improved.

The Transmission Control System in the Second Preferred Embodiment

Figure 5:
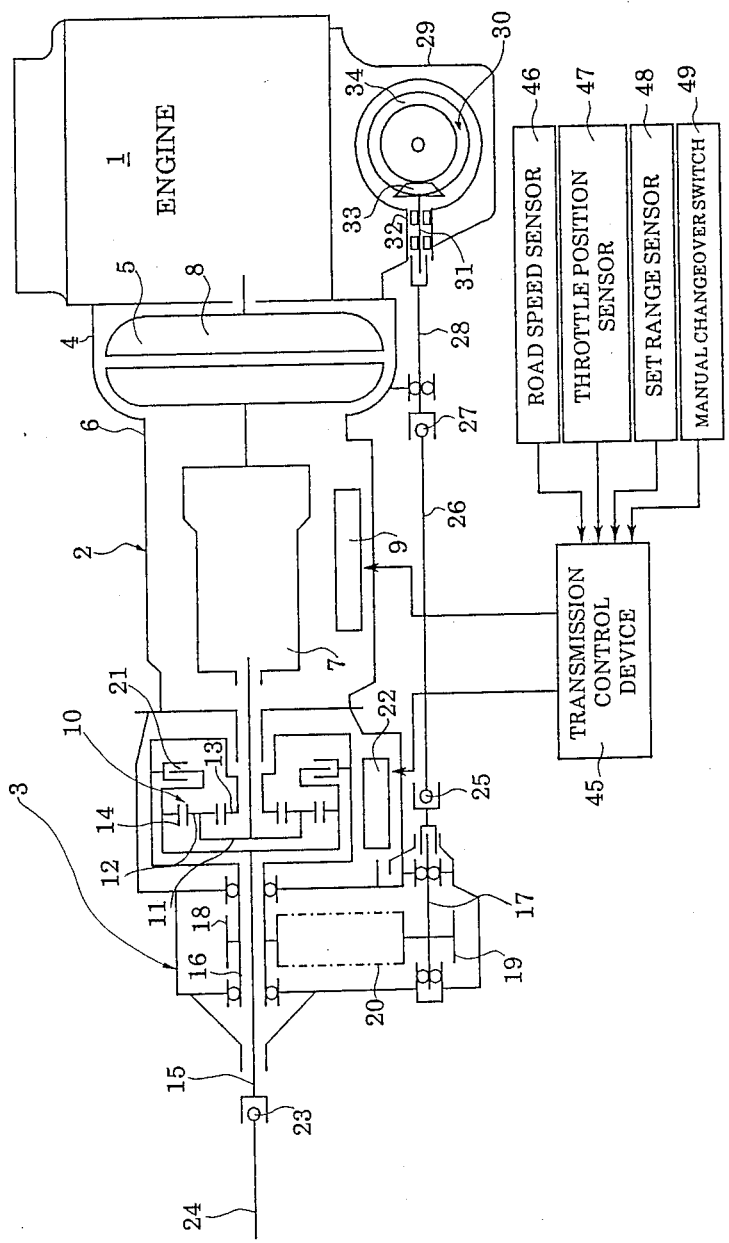
FIG. 5 is similar to FIG. 1 relating to the first preferred device and method embodiments, being a schematic longitudinal skeleton view of a vehicle power train and of a control system therefor which incorporates the second preferred embodiment of the vehicle central differential operation restriction device control device of the present invention, for practicing the second preferred method embodiment.

Referring now to FIG. 5, which is a figure similar to FIG. 1 relating to the first preferred device and method embodiments, and is a schematic longitudinal skeleton view of a vehicle power train (substantially the same as the FIG. 1 power train) and of a control system therefor which incorporates the second preferred embodiment of the vehicle central differential operation restriction device control device of the present invention, for practicing the second preferred method embodiment: it will be seen that the following detectors and sensors are provided to the transmission control system, in this case. A road speed sensor 46 detects a value representative of the road speed of the vehicle by measuring the rotational speed of a member rotationally coupled to the rear wheel power output shaft 15, or the like, and outputs an electrical signal representative thereof. A throttle position sensor 47 detects a value representative of the current load on the internal combustion engine 1 by measuring the opening angle of the throttle valve (not particularly shown) of a carburetor (not shown either) of said engine 1, and outputs an electrical signal representative thereof. A set range sensor 48 detects the set position of a manual range setting valve which is provided for the transmission mechanism 2, or of a setting means therefor, and outputs an electrical signal representative thereof; again, this manual range setting valve is not particularly shown in the figures, but said setting means therefor is provided in the passenger compartment of the vehicle so as to be readily accessible to the driver of the vehicle, and can be set to any one of a number of set positions corresponding to various operational ranges for the transmission mechanism 2 such as "D" range, "2" range, "L" range, "R" range, "N" range, and "P" range. And, in this second preferred embodiment, a manual changeover switch 49 is provided in the passenger compartment of the vehicle so as to be readily accessible to the driver of the vehicle, and can be set to either one of two positions: one for indicating that the center differential device 10 is to be constantly locked up, i.e. for indicating that the vehicle is to be operated in a center differential locked up operational mode, and the other for indicating that the center differential device 10 is not to be constantly locked up, i.e. for indicating that the vehicle is to be operated in a center differential non locked up operational mode. The output signals of these four sensors and switches 46, 47, 48, and 49 are fed to the transmission control device 45.

This transmission control device 45 outputs control signals for controlling the electric/hydraulic control device 22 for the four wheel drive power transfer device 3 and for controlling the electrical/hydraulic control mechanism 9 for the gear transmission mechanism 7, according to principles which incorporate the concept of the second preferred embodiment of the vehicle central differential operation restriction device control device and method of the present invention, as will now be explained. It should be understood that, as before, no concrete illustration of the structure of any particular realization of the transmission control device 45 will be given herein, since various possibilities for the details thereof can be easily supplemented by one of ordinary skill in the electronic and computer programming art based upon the functional disclosures set out in this specification. Again, in these second preferred embodiments of the device and the method of the present invention, the transmission control device 45 is concretely realized as a micro computer and its associated circuitry, said micro computer operating at the behest of a control program which will not be completely particularly detailed, since many of the details thereof can likewise be easily supplemented by one of ordinary skill in the electronic and computer programming art based upon the functional disclosures set out in this specification. However, as before, it should be particularly understood that such realizations in the micro computer form, although preferred, are not the only ways in which the transmission control device 45 can be provided; in other possible embodiments it could be constituted as an electrical device not incorporating a microprocessor. In the preferred case, as before, this microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and switches 46 through 49 to the input port device, and drive circuits through which actuating electrical signals are passed from the output port device to a speed change control solenoid or solenoids of the electrical/hydraulic control mechanism 9 for controlling the automatic speed change device 2 and to a control solenoid or the like of the electric/hydraulic control device 22 for controlling the torque transmission capacity of the clutch 21 of the four wheel drive power transfer device 3 by supplying appropriate hydraulic fluid pressure to its pressure chamber 36. It should be understood that, as before, the transmission control device 45 generally functions so as to engage an appropriate one of the various speed stages of the gear transmission mechanism 7 of the transmission mechanism 2 according to the current values of various vehicle operating parameters such as the vehicle road speed as sensed by the road speed sensor 46, the engine load (throttle opening) as sensed by the throttle position sensor 47, and the operating range of the transmission as manually set by the vehicle driver on the setting means therefor as sensed by the set range sensor 48; such a transmission shift stage selection function again may be performed in a per se conventional way, and no particular details thereof will be shown or suggested in this specification, since various possibilities for the details thereof can be easily suppliemented as appropriate by one of ordinary skill in the transmission control and the programming arts, particularly when based upon the functional disclosures set out in this specification. Further, said transmission control device 45 generally functions as will now be explained, so as to control the torque transmission capacity of the clutch 21 of the center differential device 10 of the four wheel drive power transfer device 3, according to the current values of the road speed of the vehicle as sensed by the road speed sensor 46, the load on the engine 1 of the vehicle as sensed by the throttle position sensor 47 and as represented by the throttle opening theta, and of the operational mode for the center differential device 10 as set on the manual changeover switch 49.

The Control According to the Second Method Embodiment

In detail, when the manual changeover switch 49 is set by the vehicle driver to its position which indicates that the center differential device 10 is not to be constantly locked up, i.e. which indicates that the vehicle is to be operated in a center differential non locked up operational mode, then the servo actuator for the clutch 21 of the center differential device 10 of the four wheel drive power transfer device 3 is supplied by the transmission control device 45 with an electrical signal which causes said clutch 21 to be not locked up at all, i.e. to provide a minimum torque transmission capacity Tc which is in fact substantially zero; whereas, on the other hand, when said manual changeover switch 49 is set by the vehicle driver to its position which indicates that the center differential device 10 is in fact to be constantly locked up, i.e. which indicates that the vehicle is to be operated in a center differential locked up operational mode, then the servo actuator for the clutch 21 of the center differential device 10 of the four wheel drive power transfer device 3 is supplied with an electrical signal by the transmission control device 45 which causes said clutch 21 to provide a maximum torque transmission capacity Tc which varies according to the vehicle operational circumstances. In detail, at this time, according to the current values of various vehicle operational parameters such as engine throttle opening theta and vehicle road speed V, a determination is made by the transmission control device 45 as to whether or not the vehicle is currently being operated in a high speed steady driving mode; and, if the result of this determination is YES (i.e. the current driving mode is in fact the high speed steady driving mode), then said clutch 21 is not in fact substantially engaged; while on the other hand, if the result of this determination is NO (i.e. the current driving mode is not in fact the high speed steady driving mode), then said clutch 21 is substantially fully engaged. And, in this second preferred embodiment, in fact the high speed steady driving operational area is divided into two regions, and in the higher speed region the forced release region for the clutch 21 in terms of throttle opening is increased in size.

Figure 6:
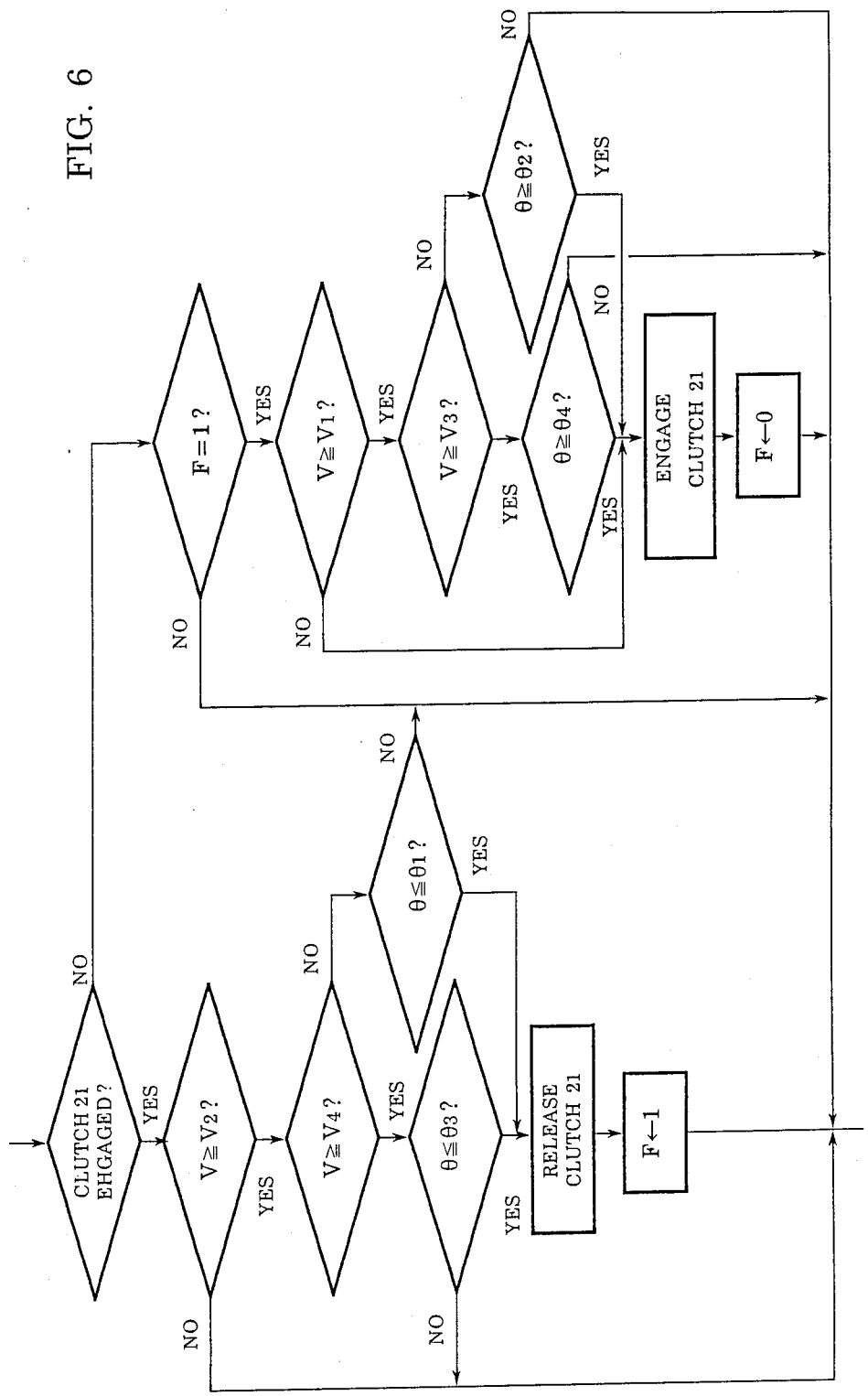
FIG. 6 is similar to FIG. 3 relating to the first preferred device and method embodiments, being a fragmentary flow chart for showing the operation of this second preferred method embodiment, illustrating the flow of a program which is obeyed by a transmission control device which is shown by a block in FIG. 4 and is included in this second preferred device embodiment.

FIG. 6 shows a fragmentary flow chart for the portion of the aforementioned control program which thus directs the operation of the transmission control device 45, in the case of said manual changeover switch 49 being thus set by the vehicle driver to its position which indicates that the center differential device 10 is not to be constantly locked up, i.e. which indicates that the vehicle is to be operated in a center differential non locked up operational mode, according to this second preferred embodiment of the four wheel drive vehicle central differential operation restriction device control device of the present invention, so as to realize the second preferred embodiment of the four wheel drive vehicle central differential operation restriction device control method of the present invention. This flow chart will now be explained; no particular programming steps for implementing said flow chart are shown or suggested in this specification, since various possibilities for the details thereof can be easily supplemented as appropriate by one of ordinary skill in the programming art, particularly when based upon the functional disclosures set out in this specification. The flow chart of FIG. 6 only shows the portion of the control program of the transmission control device 45 which controls the supply of actuating hydraulic fluid pressure to the clutch 21 of the center differential device 10 of the four wheel drive power transfer device 3, i.e. to the electrically actuated electric/hydraulic control device 22, and further only shows this process in schematic form; said FIG. 6 flow chart therefore does not show any of the portions of said control program relating to the control provided for the gear transmission mechanism 7 of the transmission mechanism 2. This fragment will be sufficient for exemplifying the principles of this second preferred embodiment of the present invention. This program portion is executed at regular intervals of for example a few milliseconds, of course after the engine 1 is started as the vehicle incorporating it is driven.

In this FIG. 6 flow chart, first the transmission control device 45 makes a decision is made as to whether or not the clutch 21 is currently fully engaged. If the result of this decision is YES, so that the clutch 21 is in fact currently fully engaged, then the flow of control passes next to the left side of the FIG. 6 flow chart; but, on the other hand, if the result of this is NO, so that the clutch 21 is in fact not currently fully engaged (i.e. is currently not substantially engaged), then the flow of control passes next to the right side of the FIG. 6 flow chart.

To consider first this left side of the FIG. 6 flow chart, which is performed if and only if the clutch 21 is in fact currently engaged and has the function of perhaps disengaging said clutch 21: first a decision is made as to whether or not the current value of the vehicle road speed V is greater than or equal to a determinate vehicle road speed value V2. If the result of this decision is No, so that the current value of the vehicle road speed V is in fact less than V2, then the flow of control passes next to exit this program fragment, without doing anything further; but, on the other hand, if the result of this decision is YES, so that the current value of the vehicle road speed V is in fact greater than or equal to V2, then the flow of control passes next to a decision step in which a decision is made as to whether or not the current value of the vehicle road speed V is greater than or equal to another determinate vehicle road speed value V4 which is greater than the above mentioned road speed value V2 (see FIG. 7). If the result of this decision is NO, so that the current value of the vehicle road speed V is in fact less than V4 but is greater than V2, then the flow of control passes next to a decision step in which a decision is made as to whether or not the current value of the engine throttle opening theta is less than or equal to a determinate throttle opening value theta1; but, on the other hand, if the result of this decision is YES, so that the current value of the vehicle road speed V is in fact greater than or equal to V4 (and a fortiori is greater than or equal to V2), then the flow of control passes next to a decision step in which a decision is made as to whether or not the current value of the engine throttle opening theta is less than or equal to a determinate throttle opening value theta3. In either of these decision steps relating to the engine throttle opening theta, if the result of the decision is that in fact the current value theta of the engine throttle opening is in fact greater than the threshold value therefor (theta1 or theta3 as the case may be), then the flow of control passes next to exit this program fragment, without doing anything further; but, on the other hand, if the result of this decision is that in fact the current value theta of the engine throttle opening is in fact less than or equal to said threshold value therefor (theta1 or theta3 as the case may be), then the flow of control passes next to a step in which the clutch 21 is released by the transmission control device 45; and then the value of a flag F is set to unity, and the flow of control passes next to exit this program fragment without doing anything further.

Now to consider the right side of the FIG. 6 flow chart, which is performed if and only if the clutch 21 is in fact currently disengaged and has the function of perhaps engaging said clutch 21: first a decision is made as to whether or not the current value of the flag F is unity. If the result of this decision is NO, so that in fact the current value of the flag F is not unity (and thus is zero), then the flow of control passes next to exit this program fragment without doing anything further; but, if the result of this decision is YES, so that indeed in fact the current value of the flag F is unity, then the flow of control passes next to a decision step in which a decision is made as to whether or not the current value of the vehicle road speed V is greater than or equal to a determinate vehicle road speed value V1 which is less than the previously mentioned value V2. If the result of this decision is NO, so that the current value of the vehicle road speed V is in fact less than V1, then the flow of control passes next to a step in which the clutch 21 is engaged by the transmission control device 45; and then the value of the flag F is set to zero, and the flow of control passes next to exit this program fragment without doing anything furthr; but, on the other hand, if the result of this decision is YES, so that the current value of the vehicle road speed V is in fact greater than or equal to V1, then the flow of control passes next to a decision step in which a decision is made as to whether or not the current value of the vehicle road speed V is greater than or equal to another determinate vehicle road speed value V3 which is greater than the above mentioned road speed values V1 and V2 (see FIG. 7). If the result of this decision is NO, so that the current value of the vehicle road speed V is in fact less than V3 but is greater than V1, then the flow of control passes next to a decision step in which a decision is made as to whether or not the current value of the engine throttle opening theta is greater than or equal to a determinate throttle opening value theta2; but, on the other hand, if the result of this decision is YES, so that the current value of the vehicle road speed V is in fact greater than or equal to V3 (and a fortiori is greater than or equal to V1), then the flow of control passes next to a decision step in which a decision is made as to whether or not the current value of the engine throttle opening theta is greater than or equal to a determinate throttle opening value theta4. In either of these decision steps relating to the engine throttle opening theta, if the result of the decision is that in fact the current value theta of the engine throttle opening is in face less than the threshold value therefor (theta2 or theta4 as the case may be), then the flow of control passes next to exit this program fragment, without doing anything further; but, on the other hand, if the result of this decision is that in fact the current value theta of the engine throttle opening is in fact greater than or equal to said threshold value therefor (theta2 or theta4 as the case may be), then the flow of control passes next to the previously mentioned steps in which the clutch 21 is engaged by the transmission control device 45, and then the value of the flag F is set to zero; and the flow of control passes next to exit this program fragment without doing anything further.

Figure 7:
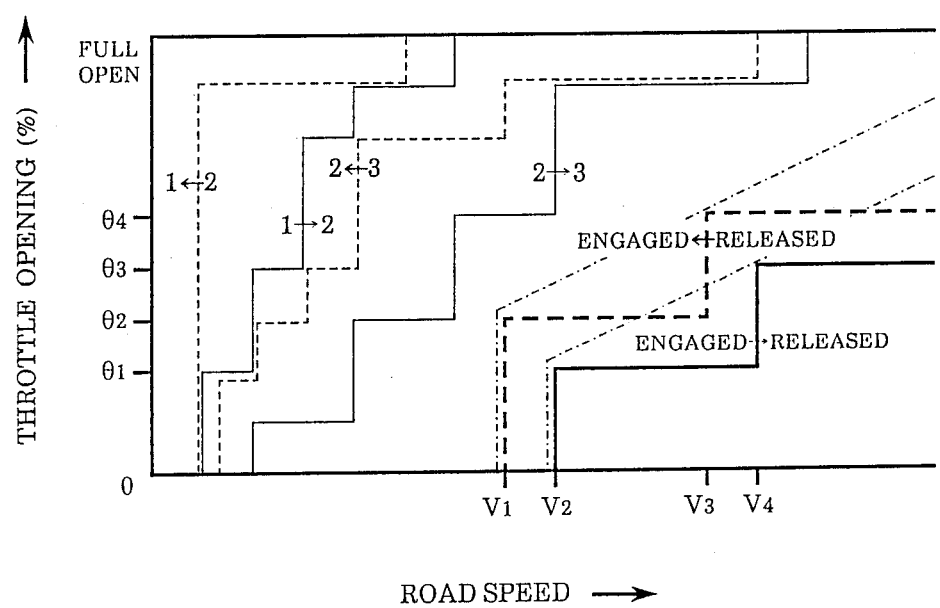
FIG. 7 is a transmission speed stage and clutch engagement shift diagram relating to the operation of said FIG. 6 program fragment, showing along the vertical axis engine throttle opening (engine load), and showing along the horizontal axis vehicle road speed.

Thus, referring now to FIG. 7 which is a transmission speed stage and clutch engagement shift diagram in which vehicle road speed is shown along the horizontal axis and engine throttle opening (engine load) is shown along the vertical axis, it will be understood that when the vehicle road speed V is above the certain lower determinate threshold road speed V2 (the lower forced release speed value) but is below the certain higher determinate threshold road speed V4 (the higher forced release speed value), then, if the throttle opening theta is not more than the first certain determinate threshold value theta1 therefor (the lower forced release throttle opening value), even if the manual changeover switch 49 is set by the vehicle driver to its position which indicates that the center differential device 10 is in fact to be constantly locked up and the vehicle is to be operated in a center differential locked up operational mode, nevertheless the servo actuator for the clutch 21 of the center differential device 10 of the four wheel drive power transfer device 3 is supplied with an electrical signal by the transmission control device 45 which causes said clutch 21 to be substantially disengaged, thus preventing the occurrence of the so called screw up torque phenomenon. And, if on the other hand the vehicle road speed V is above said certain higher determinate threshold road speed V4 (the higher forced release speed value), then, if the throttle opening theta is not more than a second certain determinate threshold value theta3 therefor (the higher forced release throttle opening value), again the same operation is performed, and the same beneficial effect is obtained. In this case, it should be noted that the value theta3 is set so as to be substantially higher than the value theta1. However, in high speed driving conditions, even when the vehicle road speed V is above said certain lower and/or higher determinate threshold road speeds V2 and V4, when the value of the throttle opening theta is sufficiently large, this forced release of the clutch 21 is not carried out, and accordingly the directly coupled center differential locked up operational mode is definately practiced, thereby providing good driving characteristics for the vehicle during this time of high speed vehicle operation. And of course, in this case when the manual changeover switch 49 is set by the vehicle driver to its position which indicates that the center differential device 10 is in fact to be constantly locked up, when the the vehicle road speed V is below said certain lower determinate threshold road speed V2, even if the value of the throttle opening theta is small, the clutch 21 is definitely and positively engaged.

Thus it is seen that, in these second preferred embodiments of the vehicle central differential operation restriction device control device and method of the present invention, the high vehicle road speed operational area is divided into two sub areas, and in the higher road speed one of these the forced clutch release area (in terms of engine throttle opening) is increased.

It should also be noted that the corresponding switching over of the clutch 21 from its released condition to its engaged condition is done on a different set of values for vehicle road speed and engine throttle opening; in detail, the certain determinate road speed values V1 and V3 are set to be lower than the certain determinate road speed values V2 and V4 respectively, and also the certain determinate engine throttle opening values theta2 and theta 4 are set to higher than the certain determinate engine throttle opening values theta1 and theta3 respectively. By this means, the occurrence of the so called hunting phenomenon due to rapid fluctuation of the vehicle throttle opening is avoided, and a certain degree of hysteresis in the operation of the device and method of the present invention are provided.

As a modification of this program fragment, a similar program fragment whose flow chart is not particularly shown may be utilized; the difference between such a program and the program whose flow chart is shown in FIG. 6 is that in this newly suggested implementation the forced clutch 21 disengagement area in terms of engine throttle opening is increased substantially linearly along with vehicle road speed. The effect of such a modification is shown in the FIG. 7 shift diagram by the dot dashed lines; the operation and the practicability of these modified device and method embodiments will be clear to one of ordinary skill in the relevant art without undue or further explanation.

Now, an advantage of the manner in which at least these second preferred embodiments of the vehicle central differential operation restriction device control device and method of the present invention are implemented is that the control device (the transmission control device 45) which controls the clutch 21 via the electric/hydraulic control device 22 can be the same physical unit as the control device which controls the gear transmission mechanism 7 via the electrical/hydraulic control mechanism 9, and the vehicle road speed sensor 46 and the throttle position sensor 47 may also be common to these control systems. This commonality of control device and sensors mans that the control of the clutch 21 need impose no unreasonable burdens upon the cost of the transmission as a whole or on the overall expense of the vehicle incorporating it, and further the circuitry is rendered simple and the implementability of the system is kept high.

As an alternative to the ON/OFF type of control of the clutch 21 of the center differential device 10 that was provided in the shown and disclosed above second preferred embodiments of the vehicle central differential operation restriction device control device and method of the present invention, it would be possible to provide a quantitive form of control of the maximum torque transmitting capacity of said clutch 21, so that, when the vehicle road speed is at least a certain threshold value and also the engine throttle opening is not more than a certain threshold value, the engagement pressure of said clutch 21 should be somewhat reduced although not brought substantially to zero as in the above disclosed case. Such a form of control would provide a certain degree of slippage of said central differential device differential inhibition clutch 21, in order to prevent the screw up torque phenomenon during high speed low throttle operation, without completely disengaging said clutch 21.

As a matter of course, the load on the internal combustion engine 1 could alternatively be determined, not by the opening of a throttle valve of a carburetor thereof as was the case in the various above disclosed preferred device and method embodiments, but according to the amount of depression of an accelerator pedal fitted in the passenger compartment of the vehicle and adapted to be depressed by the foot of the vehicle driver, or according to the amount of fuel which is injected to the cylinders of said engine 1 (in the case that fuel injection is the form of fuel provision which is equipped to said engine 1), or according to the torque supplied by said engine 1 to its power output shaft (its crank shaft), or the like. All such variations should be considered as being within the scope of the present invention.

The Transmission Control System in the Third Preferred Embodiment

For the third preferred device and method embodiments, no particular schematic longitudinal skeleton view of any vehicle power train or control system therefor will be shown, since the power train of FIG. 5 is suitable for application of these third preferred embodiments, also; with the additional feature, which does not specifically need to be shown in a figure and therefore is not, that a lock up clutch, to be referred to hereinafter by the reference numeral 5a, is provided to the torque converter 5. This lock up clutch 5a is of a per se conventional construction. It should be understood that the transmission control device 45 generally functions so as either to engage or to disengage said lock up clutch, according to the current values of various vehicle operating parameters such as the vehicle road speed as sensed by the road speed sensor 46, the engine load (throttle opening theta) as sensed by the throttle position sensor 47, and the operating range of the transmission as manually set by the vehicle driver on the setting means therefor as sensed by the set range sensor 48. Such a lock up clutch operation function may be peformed in a per se conventional way, and no particular details thereof will be shown in this specification, since various possibilities for the details thereof can be easily supplemented as appropriate by one of ordinary skill in the transmission control and the programming arts, particularly when based upon the functional disclosures set out in this specification; a particular example of such a lock up clutch operation function is shown in the transmission shift diagram of FIG. 8 for the purposes of reference. In this case, as in the case of the vehicle power train and control system therefor to which the second preferred embodiments of the present invention were applied, the control system for the transmission comprises: a road speed sensor 46 which detects a value representative of the rotational speed of the rear wheels of the vehicle by measuring the rotational speed of a member rotationally coupled to the rear wheel power output shaft 15, or the like, and which outputs an electrical signal representative thereof; a throttle position sensor 47 which detects a value representative of the current load on the internal combustion engine 1 by measuring the opening angle of the throttle valve (not particularly shown) of a carburetor (not shown either) of said engine 1, and which outputs an electrical signal representative thereof; a set range sensor 48 which detects the set position of a manual range setting valve which is provided for the transmission mechanism 2, or of a setting means therefor, and which outputs an electrical signal representative thereof; and a manual changeover switch 49, which is provided in the passenger compartment of the vehicle so as to be readily accessible to the driver of the vehicle, and which can be set to either one of two positions, one for indicating that the center differential device 10 is to be constantly locked up, i.e. for indicating that the vehicle is to be operated in a center differential locked up operational mode, and the other for indicating that the center differential device 10 is not to be constantly locked up, i.e. for indicating that the vehicle is to be operated in a center differential non locked up operational mode. The output signals of these four sensors and switches 46, 47, 48, and 49 are fed to the transmission control device 45.

This transmission control device 45 outputs control signals for controlling the electric/hydraulic control device 22 for the four wheel drive power transfer device 3, for controlling the electrical/hydraulic control mechanism 9 for the gear transmission mechanism 7, and for controlling the lock up clutch 5a, according to principles which incorporate the concept of the third preferred embodiment of the vehicle central differential operation restriction device control device and method of the present invention, as will now be explained. It should be understood that, as before, no concrete illustration of the structure of any particular realization of the transmission control device 45 will be given herein, since various possibilities for the details thereof can be easily supplemented by one of ordinary skill in the electronic and computer programming art based upon the functional disclosures set out in this specification.

Again, in these third preferred embodiments of the device and the method of the present invention, the transmission control device 45 is concretely realized as a micro computer and its associated circuitry, said micro computer operating at the behest of a control program which will not be completely particularly detailed, since many of the details thereof can likewise be easily supplemented by one of ordinary skill in the electronic and computer programming art based upon the functional disclosures set out in this specification. However, as before, it should be particularly understood that such realizations in the micro computer form, although preferred, are not the only ways in which the transmission control device 45 can be provided; in other possible embodiments it could be constituted as an electrical device not incorporating a microprocessor. In the preferred case, as before, this microprocessor will typically comprise: a CPU (central processing unit) which obeys said control program to be described shortly and which inputs data, performs calculations, and outputs data; a ROM (read only memory) which stores said program to be described shortly and initialization data therefor and so on; and a RAM (random access memory) which stores the results of certain intermediate calculations and data and so on; and these devices together will constitute a logical calculation circuit, being joined together by a common bus which also links them to an input port and an output port which together perform input and output for the system. And the system will typically also include buffers for the electrical signals outputted from the various sensors and switches 46 through 49 to the input port device, and drive circuits through which actuating electrical signals are passed from the output port device to a speed change control solenoid or solenoids of the electrical/hydraulic control mechanism 9 for controlling the automatic speed change device 2, to a control solenoid or the like of the electric/hydraulic control device 22 for controlling the torque transmission capacity of the clutch 21 of the four wheel drive power transfer device 3 by supplying appropriate hydraulic fluid pressure to its pressure chamber 36, and to a control solenoid or the like of the lock up clutch 5a for controlling its torque transmission capacity by supplying appropriate hydraulic fluid pressure to it. It should be understood that, as before, the transmission control device 45 generally functions so as to engage an appropriate one of the various speed stages of the gear transmission mechanism 7 of the transmission mechanism 2 according to the current values of various vehicle operating parameters such as the vehicle road speed as sensed by the road speed sensor 46, the engine load (throttle opening) as sensed by the throttle position sensor 47, and the operating range of the transmission as manually set by the vehicle driver on the setting means therefor as sensed by the set range sensor 48; such a transmission shift stage selection function may, as before, be performed in a per se conventional way, and no particular details thereof will be shown or suggested in this specification, since various possibilities for the details thereof can be easily supplemented as appropriate by one of ordinary skill in the transmission control and the programming arts, particularly when based upon the functional disclosures set out in this specification. Further, said transmission control device 45 generally functions as will now be explained, so as to control the torque transmission capacity of the clutch 21 of the center differential device 10 fo the four wheel drive power transfer device 3.

The Control According to the Third Method Embodiment

Figure 8:
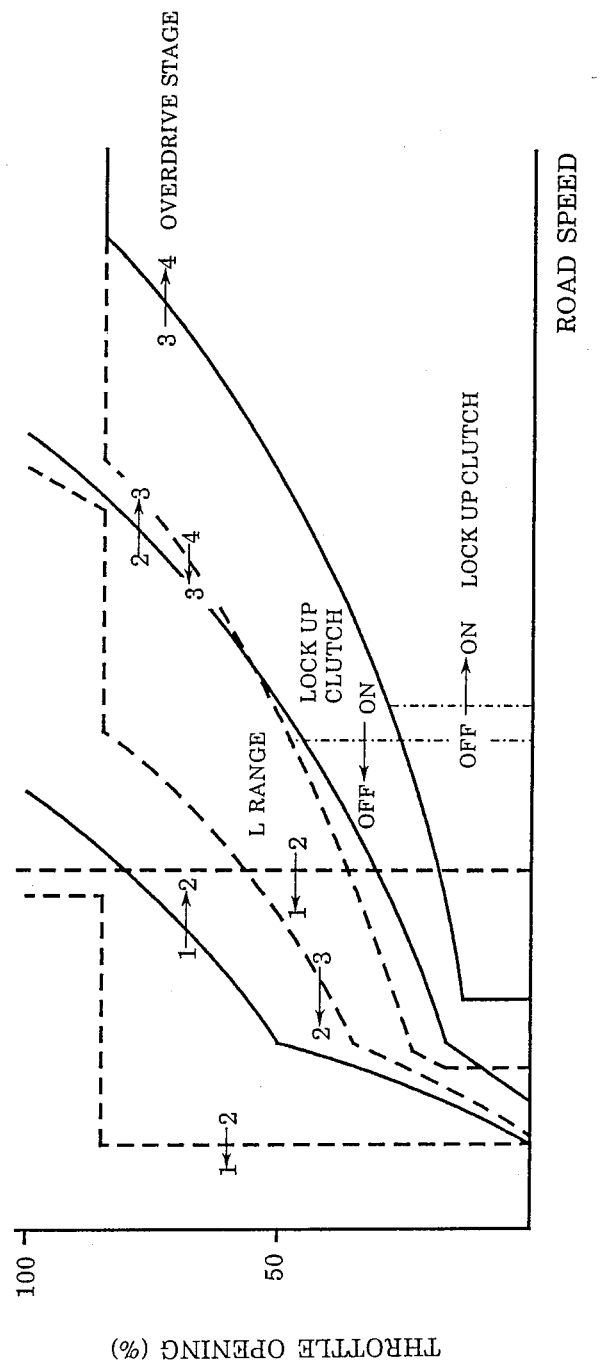
FIG. 8 is similar to FIG. 7 relating to the second preferred device and method embodiments, being, for the case of the third preferred device and method embodiments, a transmission speed stage and lock up clutch engagement shift diagram.

In detail, when the gear transmission mechanism 7 of the transmission mechanism 2 is being controlled to be in a speed stage other than its top speed stage (which may in fact be an overdrive speed stage, and typically may be the fourth speed stage of said gear transmission mechanism 7 as exemplarily indicated in FIG. 8), then the maximum torque transmission capacity Tc of the clutch 21 of the center differential device 10 of the four wheel drive power transfer device 3 is controlled to be large, if and only if the manual changeover switch 49 is set to its position for indicating that the center differential device 10 is to be constantly locked up, i.e. for indicating that the vehicle is to be operated in the center differential locked up operational mode. In other words, the clutch 21 is engaged so as to lock up the center differential device 10, when and only when so commanded by the driver of the vehicle by operating the manual changeover switch 49 appropriately, provided that the gear transmission mechanism 7 is not currently engaged to its highest speed stage; but, if in fact said gear transmission mechanism 7 is currently engaged to its said highest speed stage, then by contrast said clutch 21 is never engaged, and thus the center differential device 10 is never locked up in these operational circumstances, even if the driver of the vehicle issues a command to that effect by operating the manual changeover switch 49. No particular details of how the transmission control device 45 performs this operation will be disclosed herein, i.e. no particular flow chart for the operation of any micro computer incorporated in said transmission control device 45 will be laid out in this specification, since various possibilities for the details thereof can be easily supplemented as appropriate by one of ordinary skill in the transmission control and the programming arts when based upon the functional disclosures set out in this specification.

As a natural corollary of the above mode of operation, when the gear transmission mechanism 7 is not currently engaged to its highest speed stage and the clutch 21 is engaged so as to lock up the center differential device 10 by the appropriate operation of the manual changeover swtich 49, and then subsequently the transmission control device 45 operates so as to shift said gear transmission mechanism 7 up into its said highest speed stage according to variation of vehicle operational parameters, then at this time the locking up of the clutch 21 is forcibly released, so as to subsequently obtain the differential effect from the center differential device 10, and thus to prevent the occurrence of the phenomenon of screw up torque.

And, conversely, when the gear transmission mechanism 7 is currently engaged to its highest speed stage and thus the clutch 21 is disengaged so as to allow the differential operation of the center differential device 10, while nevertheless the manual changeover switch 49 is set to its position for indicating that said clutch 21 is to be engaged for preventing the differential operation of the center differential device 10, and then subsequently the transmission control device 45 operates so as to shift said gear transmission mechanism 7 down from its said highest speed stage according to variation of vehicle operational parameters, then at this time the clutch 21 is forcibly engaged, so as to subsequently prevent the provision of the differential effect by the center differential device 10, and thus to provide good vehicle operational characteristics with the directly coupled four wheel drive operational mode.

The operational area in which the engagement of the clutch 21 of the center differential device 10 is prohibited is the same as the area in which the highest speed stage of the gear transmission mechanism 7 (such as the overdrive speed stage thereof) is engaged, i.e. as suggested in FIG. 8 is the operational area of relatively high vehicle road speed and not extremely high engine power output, and thereby it is ensured that in this operational area rotational speed differences between the front vehicle wheels and the rear vehicle wheels are absorbed by differential operation of said center differential device 10, while outside this operational area good vehicle operational characteristics are obtained by prohibition of said differential operation of said center differential device 10.

Figure 9:
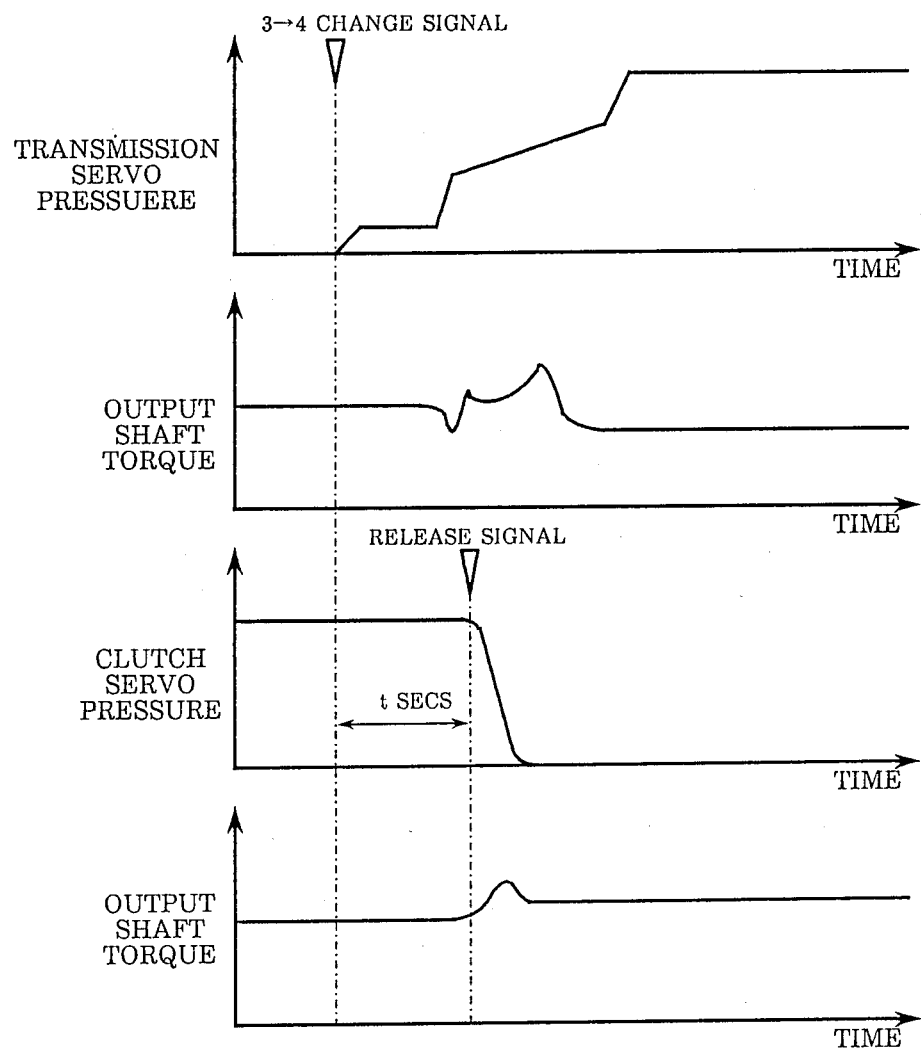
FIG. 9 is a time chart for explaining the operation of said third preferred device and method embodiments, showing the time behavior of the magnitude of the engaging hfp which is being supplied to a servo device of the gear transmission mechanism of the vehicle, the corresponding time behavior of the torque on the output shaft of said gear transmission mechanism with other influences upon said output shaft torque being ignored, the time behavior of the magnitude of the engaging hfp which is being supplied to a pressure chamber of a servo device for a clutch of a center differential device of the vehicle, and the corresponding time behavior of the torque on the output shaft of said gear transmission mechanism 7 again with other influences upon said output shaft torque being ignored.

FIG. 9 is a time chart for explaining a particular feature of the operation of these third preferred device and method embodiments. At the top of FIG. 9 there is presented a chart portion showing the time behavior of the magnitude of the engaging hfp which is being supplied to a servo device of the gear transmission mechanism 7, high such hfp when supplied causing said gear transmission mechanism 7 to be engaged to its said highest speed stage while low such hfp when supplied causing said gear transmission mechanism 7 to be engaged to a speed stage other than its said highest speed stage; next below said above chart portion there is presented another chart portion showing the corresponding time behavior of the torque on the output shaft of the gear transmission mechanism 7, other influences upon said output shaft torque being ignored; next below said chart portion there is presented another chart portion showing the time behavior of the magnitude of the engaging hfp which is being supplied to the pressure chamber such as 36 of the servo device such as 35 for the clutch 21 of the center differential device 10, high such hfp when supplied causing said clutch 21 to be engaged and to prevent differential operation of said center differential device 10 while low such said hfp when supplied causing said clutch 21 to be disengaged and to allow differential operation of said center differential device 10; and lastly at the bottom of FIG. 9 there is presented a fourth chart portion showing the corresponding time behavior of the torque on the output shaft of the gear transmission mechanism 7, other influences upon said output shaft torque again being ignored. Thus, the second and the fourth portions from the top of this FIG. 9 show the individual shift shocks to which the power train of the vehicle is subjected, one caused by the shifting of the gear transmission mechanism 7 into its said highest speed stage, and the other caused by the disengagement of said clutch 21 so as to allow differential action to be newly provided by said center differential device 10. In each of these cases, the time point of initial dispatch of the causative pressure signal therefor is indicated in, respectively, the first and the third portions from the top of this FIG. 9 by the dot dashed line and the bullet; and it will be readily understood that, typically, the time lag between initial dispatch of such a causative pressure signal for the shifting of the gear transmission mechanism 7 into its said highest speed stage (top portion of FIG. 9) and the torque shock attributable to the actual shifting up of said gear transmission mechanism 7 (second portion down from the top of FIG. 9) is liable to be substantially greater, than the time lag between initial dispatch of such a causative pressure signal for the disengagement of said clutch 21 (third portion down from the top of FIG. 9) and the torque shock attributable to the actual disengagement of said clutch 21 (bototm portion of FIG. 9). If, as is suggested in FIG. 9, the timings of the initial dispatch of these two causative signals are suitably arranged (i.e. are separated by an appropriate time interval shown as "t" in the figure) so that the torque shocks attributable to the actual occurrences of these phenomena are more or less coincident in time, then these two torque shocks will blend together in actual fact to produce one combined torque shock, and will at least to some extent tend to cancel one another out. Accordingly, by making these two torque shocks occur at the same time, it is effectively prevented that they should occur one after the other in sequence, and further the overall magnitude of the torque shock to which the vehicle power train is subjected is reduced, so that the discomfortability of such torque shock, as well as the wear and tear to which said vehicle power train are sujected, are advantageously reduced.

The operational area in which the engagement of the clutch 21 of the center differential device 10 is prohibited may, as an alternative to the above suggested one, be the area in which the highest speed stage of the gear transmission mechanism 7 (such as the overdrive speed stage thereof) is engaged and also the lock up clutch 5a of the torque converter 5 is engaged. By this further restriction of said operational area in which the engagement of the clutch 21 of the center differential device 10 is prohibited, thereby it is ensured that the operational area in which good four wheel drive type vehicle operational characteristics are obtained by prohibition of said differential operation of said center differential device 10 is extended over a wider range.

Again, as an alternative to the ON/OFF type of control of the clutch 21 of the center differential device 10 that was provided in the above shown and disclosed third preferred embodiments of the vehicle central differential operation restriction device control device and method of the present invention, it would be possible to provide a quantitive form of control of the maximum torque transmitting capacity of said clutch 21, so that, when the highest speed stage of the gear transmission mechanism 7 was engaged, or alternatively when said highest speed stage of the gear transmission mechanism 7 was engaged and also the lock up clutch 5a of the torque converter 5 was engaged, the engagement pressure of said clutch 21 should be somewhat reduced although not brought substantially to zero as in the above disclosed case. Such a form of control would provide a certain degree of slippage of said central differential device differential inhibition clutch 21, in such defined operational circumstances, in order to prevent the screw up torque phenomenon during such high speed relatively low engine power output operation, however without completely disengaging said clutch 21.

Conclusion

It is acceptable according to the principle of the present invention if the constructional details of the system are varied, although the shown ones are considered to be preferred. For example, the friction engaging device for providing torque distribution between the pair of front wheels of the vehicle and the pair of rear wheels of the vehicle could, in systems to which these or other embodiments of the present invention were applied, be a clutch provided in the power transmission path either to the pair of front vehicle wheels or to the pair of rear vehicle wheels and restricting or the flow of controlling the amount of torque supplied to its pair of vehicle wheels, rather than being a central differential control clutch like the clutch 21 of the systems to which the shown preferred embodiments were applied. Other modifications could also be conceived of. Therefore, although the present invention has been shown and described in terms of the preferred embodiments of the device and of the method thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. For a four wheel drive vehicle with two front wheels, two rear wheels, an engine, and a central differential device, rotational power from said engine being provided via said central differential device to the combination of the front wheels of said vehicle and also to the combination of the rear wheels of said vehicle, and further comprising a device for selectively restricting the operation of said central differential device:
   a central differential operation restriction device control device, comprising:
   (a) a means for detecting a condition representative of the road speed of said vehicle and of the load on said engine; and:
   (b) a means for controlling said device for selectively restricting the operation of said central differential device, so that: said operation of said central differential device is less restricted than otherwise, when said vehicle speed is relatively high and said engine output is not relatively high.

2. A central differential operation restriction device control device according to claim 1, said vehicle further comprising a gear transmission mechanism provided in the rotational power transmission path between said engine and said central differential device, wherein said condition representative of the road speed of said vehicle and of the load on said engine is the engagement of the highest speed stage of said gear transmission mechanism.

3. A central differential operation restriction device control device according to claim 2, wherein said means for controlling said device for selectively restricting the operation of said central differential device does so in such a manner than said operation of said central differential device is less restricted than otherwise, when said highest speed stage of said gear transmission mechanism is engaged.

4. A central differential operation restriction device control device according to claim 2, wherein the timing of switching over of control of said device for selectively restricting the operation of said central differential device is coordinated with the timing of shifting of engagement of said gear transmission mechanism so as to at least partially overlap the individual torque shocks caused thereby.

5. A central differential operation restriction device control device according to claim 1, said vehicle further comprising a gear transmission mechanism provided in the rotational power transmission path between said engine and said central differential device, and a torque converter comprising a lock up clutch and provided in the rotational power transmission path between said engine and said gear transmission mechanism, wherein said condition representative of the road speed of said vehicle and of the load on said engine is the engagement of the highest speed stage of said gear transmission mechanism and the simultaneous engagement of said lock up clutch.

6. A central differential operation restriction device control device according to claim 5, wherein said means for controlling said device for selectively restricting the operation of said central differential device does so in such a manner that said operation of said central differential device is less restricted than otherwise, when said highest speed stage of said gear transmission mechanism is engaged and also said lock up clutch is engaged.

7. A central differential operation restriction device control device according to claim 1, wherein said condition representative of the road speed of said vehicle and of the load on said engine is the combination of the actual road speed of said vehicle and of the actual load on said engine.

8. A central differential operation restriction device control device according to claim 7, wherein said means for controlling said device for selectively restricting the operation of said central differential device does so in such a manner that said operation of said central differential device is more restricted, when said actual load on said engine is the larger.

9. A central differential operation restriction device control device according to claim 7, wherein said means for controlling said device for selectively restricting the operation of said central differential device does so in such a manner that, when said actual load on said engine is at least a determinate engine load value, said operation of said central differential device is selectively restricted, according to the actual road speed of said vehicle.

10. A central differential operation restriction device control device according to claim 9, wherein said means for controlling said device for selectively restricting the operation of said central differential device does so in such a manner that, when said actual load on said engine is at least determinate engine load value, said operation of said central differential device is more restricted, when said actual road speed of said vehicle is lower.

11. A central differential operation restriction device control device according to claim 10, wherein said means for controlling said device for selectively restricting the operation of said central differential device does so in such a manner that, when said actual load on said engine is at least said determinate engine load value, said operation of said central differential device is restricted, when said actual road speed of said vehicle is lower than a determinate vehicle road speed value.

12. For a four wheel drive vehicle with two front wheels, two rear wheels, an engine, and a central differential device, rotational power from said engine being provided via said central differential device to the combination of the front wheels of said vehicle and also to the combination of the rear wheels of said vehicle, and further comprising a device for selectively restricting the operation of said central differential device:
a central differential operation restriction device control method, wherein:

(a) a condition representative of the road speed of said vehicle and of the load on said engine is detected; and:

(b) said device for selectively restricting the operation of said central differential device is controlled, so that: said operation of said central differential device is less restricted than otherwise, when said vehicle speed is relatively high and also said engine output is not relatively high.

13. A central differential operation restriction device control method according to claim 12, said vehicle further comprising a gear transmission mechanism provided in the rotation power transmission path between said engine and said central differential device, wherein said condition representative of the road speed of said vehicle and of the load on said engine is the engagement of the highest speed stage of said gear transmission mechanism.

14. A central differential operation restriction device control method according to claim 13, wherein said device for selectively restricting the operation of said central differential device is controlled in such a manner that said operation of said central differential device is less restricted than otherwise, when said highest speed stage of said gear transmission mechanism is engaged.

15. A central differential operation restriction device control method according to claim 13, wherein the timing of switching over of control of said device for selectively restricting the operation of said central differential device is coordinated with the timing of shifting of engagement of said gear transmission mechanism so as to at least partially overlap the individual torque shocks caused thereby.

16. A central differential operation restriction device control method according to claim 12, said vehicle further comprising a gear transmission mechanism provided in the rotational power transmission path between said engine and said central differential device, and a torque converter comprising a lock up clutch and provided in the rotational power transmission path between said engine and said gear transmission mechanism, wherein said condition representative of the road speed of said vehicle and of the load on said engine is the engagement of the highest speed stage of said gear transmission mechanism and the simultaneous engagement of said lock up clutch.

17. A central differential operation restriction device control method according to claim 16, wherein said device for selectively restricting the operation of said central differential device is controlled in such a manner that said operation of said central differential device is less restricted than otherwise, when said highest speed stage of said gear transmission mechanism is engaged and also said lock up clutch is engaged.

18. A central differential operation restriction device control method according to claim 12, wherein said condition representative of the road speed of said vehicle and of the load on said engine is the combination of the actual road speed of said vehicle and of the actual load on said engine.

19. A central differential operation restriction device control method according to claim 18, wherein said device for selectively restricting the operation of said central differential device is controlled in such a manner that said operation of said central differential device is more restricted, when said actual load on said engine is the larger.

20. A central differential operation restriction device control method according to claim 18, wherein said device for selectively restricting the operation of said central differential device is controlled in such a determinate engine load value, said operation of said central differential device is selectively restricted, according to the actual road speed of said vehicle.

21. A central differential operation restriction device control method according to claim 20, wherein said device for selectively restricting the operation of said central differential device is controlled in such a manner than, when said actual load on said engine is at least said determinate engine load value, said operation of said central differential device is more restricted, when said actual road speed of said vehicle is lower.

22. A central differential operation restriction device control method according to claim 21, wherein said device for selectively restricting the operation of said central differential device is controlled in such a manner than, when said actual load on said engine is at least said determinate engine load value, said operation of said central differential device is restricted, when said actual road speed of said vehicle is lower than a determinate vehicle road speed value.

* * * * *